United States Patent
Welch et al.

(10) Patent No.: US 9,687,135 B2
(45) Date of Patent: Jun. 27, 2017

(54) AUTOMATIC DISHWASHER WITH PUMP ASSEMBLY

(71) Applicant: Whirlpool Corporation, Benton Harbor, MI (US)

(72) Inventors: Rodney M. Welch, Eau Claire, MI (US); Jordan R. Fountain, Millbrae, CA (US)

(73) Assignee: Whirlpool Corporation, Benton Harbor, MI (US)

( * ) Notice: Subject to any disclaimer, the term of this patent is extended or adjusted under 35 U.S.C. 154(b) by 7 days.

(21) Appl. No.: 14/731,481

(22) Filed: Jun. 5, 2015

(65) Prior Publication Data

US 2015/0265129 A1    Sep. 24, 2015

Related U.S. Application Data

(63) Continuation-in-part of application No. 12/910,203, filed on Oct. 22, 2010, which is a continuation-in-part of application No. 12/643,394, filed on Dec. 21, 2009, now Pat. No. 8,746,261.

(51) Int. Cl.
| | |
|---|---|
| *A47L 15/42* | (2006.01) |
| *B01D 35/02* | (2006.01) |
| *B08B 3/02* | (2006.01) |
| *C02F 1/00* | (2006.01) |
| *B08B 3/14* | (2006.01) |
| *A47L 15/06* | (2006.01) |
| *C02F 103/00* | (2006.01) |

(52) U.S. Cl.
CPC .......... *A47L 15/4202* (2013.01); *A47L 15/06* (2013.01); *A47L 15/4206* (2013.01); *A47L 15/4208* (2013.01); *A47L 15/4225* (2013.01); *B01D 35/02* (2013.01); *B08B 3/02* (2013.01); *B08B 3/14* (2013.01); *C02F 1/00* (2013.01); *C02F 2103/002* (2013.01)

(58) Field of Classification Search
None
See application file for complete search history.

(56) References Cited

U.S. PATENT DOCUMENTS

| | | | |
|---|---|---|---|
| 1,617,021 A | 2/1927 | Mitchell | |
| 2,154,559 A | 4/1939 | Bilde | |
| 2,422,022 A | 6/1947 | Koertge | |
| (Continued) | | | |

FOREIGN PATENT DOCUMENTS

| | | |
|---|---|---|
| CH | 169630 | 6/1934 |
| CN | 2571812 | 9/2003 |
| (Continued) | | |

OTHER PUBLICATIONS

European Search Report for EP11188106, Mar. 29, 2012.
(Continued)

*Primary Examiner* — Michael Barr
*Assistant Examiner* — Jason Riggleman
(74) *Attorney, Agent, or Firm* — McGarry Bair PC

(57) ABSTRACT

An automatic dishwasher with a tub that at least partially defines a treating chamber, a liquid spraying system that supplies liquid to the treating chamber, and a pump assembly that fluidly couples the treating chamber to the liquid spraying system and where the pump assembly includes a housing having an inlet, a recirculation outlet, and a drain outlet.

17 Claims, 19 Drawing Sheets

(56) References Cited

U.S. PATENT DOCUMENTS

| | | |
|---|---|---|
| 2,734,122 A | 2/1956 | Flannery |
| 3,016,147 A | 1/1962 | Cobb et al. |
| 3,026,628 A | 3/1962 | Berger, Sr. et al. |
| 3,068,877 A | 12/1962 | Jacobs |
| 3,103,227 A | 9/1963 | Long |
| 3,122,148 A | 2/1964 | Alabaster |
| 3,186,417 A | 6/1965 | Fay |
| 3,288,154 A | 11/1966 | Jacobs |
| 3,378,933 A | 4/1968 | Jenkins |
| 3,542,594 A | 11/1970 | Smith et al. |
| 3,575,185 A | 4/1971 | Barbulesco |
| 3,586,011 A | 6/1971 | Mazza |
| 3,739,145 A | 6/1973 | Woehler |
| 3,801,280 A | 4/1974 | Shah et al. |
| 3,846,321 A | 11/1974 | Strange |
| 3,906,967 A | 9/1975 | Bergeson |
| 3,989,054 A | 11/1976 | Mercer |
| 4,179,307 A | 12/1979 | Cau et al. |
| 4,180,095 A | 12/1979 | Woolley et al. |
| 4,228,962 A | 10/1980 | Dingler et al. |
| 4,326,552 A | 4/1982 | Bleckmann |
| 4,346,723 A | 8/1982 | Geiger |
| 4,754,770 A | 7/1988 | Fornasari |
| 5,002,890 A | 3/1991 | Morrison |
| 5,030,357 A | 7/1991 | Lowe |
| 5,133,863 A | 7/1992 | Zander |
| 5,331,986 A | 7/1994 | Lim et al. |
| 5,454,298 A | 10/1995 | Lu |
| 5,470,142 A | 11/1995 | Sargeant et al. |
| 5,470,472 A | 11/1995 | Baird et al. |
| 5,557,704 A | 9/1996 | Dennis et al. |
| 5,569,383 A | 10/1996 | Vander Ark, Jr. et al. |
| 5,618,424 A | 4/1997 | Nagaoka |
| 5,630,437 A | 5/1997 | Dries et al. |
| 5,711,325 A | 1/1998 | Kloss et al. |
| 5,755,244 A | 5/1998 | Sargeant et al. |
| 5,782,112 A | 7/1998 | White et al. |
| 5,803,100 A | 9/1998 | Thies |
| 5,865,997 A | 2/1999 | Isaacs |
| 5,868,937 A | 2/1999 | Back et al. |
| 5,904,163 A | 5/1999 | Inoue et al. |
| 5,924,432 A | 7/1999 | Thies et al. |
| 6,289,908 B1 | 9/2001 | Kelsey |
| 6,389,908 B1 | 5/2002 | Chevalier et al. |
| 6,443,091 B1 | 9/2002 | Matte |
| 6,460,555 B1 | 10/2002 | Tuller et al. |
| 6,491,049 B1 | 12/2002 | Tuller et al. |
| 6,601,593 B2 | 8/2003 | Deiss et al. |
| 6,666,976 B2 | 12/2003 | Benenson, Jr. et al. |
| 6,800,197 B1 | 10/2004 | Kosola et al. |
| 6,997,195 B2 | 2/2006 | Durazzani et al. |
| 7,047,986 B2 | 5/2006 | Ertle et al. |
| 7,069,181 B2 | 6/2006 | Jerg et al. |
| 7,093,604 B2 | 8/2006 | Jung et al. |
| 7,153,817 B2 | 12/2006 | Binder |
| 7,198,054 B2 | 4/2007 | Welch |
| 7,208,080 B2 | 4/2007 | Batten et al. |
| 7,232,494 B2 | 6/2007 | Rappette |
| 7,250,174 B2 | 7/2007 | Lee et al. |
| 7,270,132 B2 | 9/2007 | Inui et al. |
| 7,319,841 B2 | 1/2008 | Bateman, III et al. |
| 7,326,338 B2 | 2/2008 | Batten et al. |
| 7,347,212 B2 | 3/2008 | Rosenbauer |
| 7,350,527 B2 | 4/2008 | Gurubatham et al. |
| 7,363,093 B2 | 4/2008 | King et al. |
| 7,406,843 B2 | 8/2008 | Thies et al. |
| 7,409,962 B2 | 8/2008 | Welch |
| 7,445,013 B2 | 11/2008 | VanderRoest et al. |
| 7,497,222 B2 | 3/2009 | Edwards et al. |
| 7,523,758 B2 | 4/2009 | VanderRoest et al. |
| 7,594,513 B2 | 9/2009 | VanderRoest et al. |
| 7,819,983 B2 | 10/2010 | Kim et al. |
| 7,896,977 B2 | 3/2011 | Gillum et al. |
| 8,043,437 B1 | 10/2011 | Delgado et al. |
| 8,161,986 B2 | 4/2012 | Alessandrelli |
| 8,215,322 B2 | 7/2012 | Fountain et al. |
| 8,627,832 B2 | 1/2014 | Fountain et al. |
| 8,667,974 B2 | 3/2014 | Fountain et al. |
| 8,746,261 B2 | 6/2014 | Welch |
| 9,005,369 B2 | 4/2015 | Delgado et al. |
| 9,034,112 B2 | 5/2015 | Tuller et al. |
| 2002/0017483 A1 | 2/2002 | Chesner et al. |
| 2003/0037809 A1 | 2/2003 | Favaro |
| 2003/0168087 A1 | 9/2003 | Inui et al. |
| 2003/0205248 A1 | 11/2003 | Christman et al. |
| 2004/0007253 A1 | 1/2004 | Jung et al. |
| 2004/0103926 A1 | 6/2004 | Ha |
| 2004/0254654 A1 | 12/2004 | Donnelly et al. |
| 2005/0022849 A1 | 2/2005 | Park et al. |
| 2005/0133070 A1 | 6/2005 | Vanderroest et al. |
| 2006/0005863 A1 | 1/2006 | Gurubatham et al. |
| 2006/0042657 A1 | 3/2006 | Welch |
| 2006/0054549 A1 | 3/2006 | Schoendorfer |
| 2006/0123563 A1 | 6/2006 | Raney et al. |
| 2006/0162744 A1 | 7/2006 | Walkden |
| 2006/0174915 A1 | 8/2006 | Hedstrom et al. |
| 2006/0236556 A1 | 10/2006 | Ferguson et al. |
| 2006/0237049 A1 | 10/2006 | Weaver et al. |
| 2006/0237052 A1 | 10/2006 | Plcardat et al. |
| 2007/0006898 A1 | 1/2007 | Lee |
| 2007/0107753 A1 | 5/2007 | Jerg |
| 2007/0119478 A1 | 5/2007 | King et al. |
| 2007/0124004 A1 | 5/2007 | King et al. |
| 2007/0163626 A1 | 7/2007 | Klein |
| 2007/0186964 A1 | 8/2007 | Mason et al. |
| 2007/0246078 A1 | 10/2007 | Purtilo et al. |
| 2007/0266587 A1 | 11/2007 | Bringewatt et al. |
| 2007/0295360 A1 | 12/2007 | Jerg et al. |
| 2008/0116135 A1 | 5/2008 | Rieger et al. |
| 2008/0289654 A1 | 11/2008 | Kim et al. |
| 2008/0289664 A1 | 11/2008 | Rockwell et al. |
| 2009/0095330 A1 | 4/2009 | Iwanaga et al. |
| 2009/0283111 A1* | 11/2009 | Classen ............... A47L 15/4206 134/10 |
| 2010/0012159 A1 | 1/2010 | Verma et al. |
| 2010/0043826 A1 | 2/2010 | Bertsch et al. |
| 2010/0043828 A1 | 2/2010 | Choi et al. |
| 2010/0043847 A1 | 2/2010 | Yoon et al. |
| 2010/0121497 A1 | 5/2010 | Heisele et al. |
| 2010/0147339 A1 | 6/2010 | Bertsch et al. |
| 2010/0154830 A1 | 6/2010 | Lau et al. |
| 2010/0154841 A1 | 6/2010 | Fountain et al. |
| 2010/0175762 A1 | 7/2010 | Anacrelico |
| 2010/0224223 A1 | 9/2010 | Kehl et al. |
| 2010/0252081 A1 | 10/2010 | Classen et al. |
| 2010/0300499 A1 | 12/2010 | Han et al. |
| 2011/0061682 A1 | 3/2011 | Fountain et al. |
| 2011/0120508 A1 | 5/2011 | Yoon et al. |
| 2011/0126865 A1 | 6/2011 | Yoon et al. |
| 2011/0240070 A1 | 10/2011 | Fadler et al. |
| 2012/0097200 A1 | 4/2012 | Fountain |
| 2012/0118336 A1 | 5/2012 | Welch |
| 2012/0138107 A1 | 6/2012 | Fountain et al. |
| 2012/0167928 A1 | 7/2012 | Fountain et al. |
| 2012/0318309 A1 | 12/2012 | Tuller et al. |
| 2013/0319481 A1 | 12/2013 | Welch |
| 2013/0319485 A1 | 12/2013 | Blanchard et al. |

FOREIGN PATENT DOCUMENTS

| | | |
|---|---|---|
| CN | 2761660 | 3/2006 |
| CN | 1966129 | 5/2007 |
| CN | 2907830 | 6/2007 |
| CN | 101406379 | 4/2009 |
| CN | 201276653 | 7/2009 |
| CN | 201361486 | 12/2009 |
| CN | 101654855 | 2/2010 |
| CN | 201410325 | 2/2010 |
| CN | 201473770 | 5/2010 |
| DE | 1134489 | 8/1961 |
| DE | 1428358 A1 | 11/1968 |
| DE | 1453070 | 3/1969 |
| DE | 7105474 | 8/1971 |
| DE | 7237309 U | 9/1973 |

(56) References Cited

FOREIGN PATENT DOCUMENTS

| | | |
|---|---|---|
| DE | 2825242 A1 | 1/1979 |
| DE | 3337369 A1 | 4/1985 |
| DE | 3723721 A1 | 5/1988 |
| DE | 3842997 A1 | 7/1990 |
| DE | 4011834 A1 | 10/1991 |
| DE | 4016915 A1 | 11/1991 |
| DE | 4131914 A1 | 4/1993 |
| DE | 9415486 U1 | 11/1994 |
| DE | 9416710 U1 | 1/1995 |
| DE | 4413432 C1 | 8/1995 |
| DE | 4418523 A1 | 11/1995 |
| DE | 4433842 | 3/1996 |
| DE | 69111365 T2 | 3/1996 |
| DE | 19546965 A1 | 6/1997 |
| DE | 69403957 T2 | 1/1998 |
| DE | 19652235 | 6/1998 |
| DE | 10000772 A1 | 7/2000 |
| DE | 69605965 T2 | 8/2000 |
| DE | 19951838 A1 | 5/2001 |
| DE | 10065571 A1 | 7/2002 |
| DE | 10106514 A1 | 8/2002 |
| DE | 60206490 T2 | 5/2006 |
| DE | 60302143 | 8/2006 |
| DE | 102005023428 A1 | 11/2006 |
| DE | 102005038433 A1 | 2/2007 |
| DE | 102007007133 A1 | 8/2008 |
| DE | 102007060195 A1 | 6/2009 |
| DE | 202010006739 U1 | 8/2010 |
| DE | 102009027910 A1 | 1/2011 |
| DE | 102009028278 A1 | 2/2011 |
| DE | 102011052846 A1 | 5/2012 |
| DE | 102012103435 A1 | 12/2012 |
| EP | 0068974 A1 | 1/1983 |
| EP | 0178202 A1 | 4/1986 |
| EP | 0198496 A1 | 10/1986 |
| EP | 0208900 A2 | 1/1987 |
| EP | 0370552 A1 | 5/1990 |
| EP | 0374616 A1 | 6/1990 |
| EP | 0383028 A2 | 8/1990 |
| EP | 0405627 A1 | 1/1991 |
| EP | 437189 A1 | 7/1991 |
| EP | 0454640 A1 | 10/1991 |
| EP | 0521815 A1 | 1/1993 |
| EP | 0585905 A2 | 9/1993 |
| EP | 0702928 A1 | 8/1995 |
| EP | 0597907 B1 | 12/1995 |
| EP | 0198496 A1 * | 4/1996 |
| EP | 0725182 A1 | 8/1996 |
| EP | 0748607 A2 | 12/1996 |
| EP | 752231 A1 | 1/1997 |
| EP | 0752231 A1 | 1/1997 |
| EP | 0854311 A2 | 7/1998 |
| EP | 0855165 A2 | 7/1998 |
| EP | 0898928 A2 | 3/1999 |
| EP | 1029965 A1 | 8/2000 |
| EP | 1224902 A2 | 7/2002 |
| EP | 1256308 A2 | 11/2002 |
| EP | 1264570 | 12/2002 |
| EP | 0898928 B1 | 4/2003 |
| EP | 1319360 A1 | 6/2003 |
| EP | 1342827 | 9/2003 |
| EP | 1346680 A2 | 9/2003 |
| EP | 1386575 A1 * | 2/2004 |
| EP | 1386575 A1 | 2/2004 |
| EP | 1415587 | 5/2004 |
| EP | 1498065 A1 | 1/2005 |
| EP | 1583455 A1 | 10/2005 |
| EP | 1703834 A1 | 9/2006 |
| EP | 1743871 A1 | 1/2007 |
| EP | 1862104 A1 | 12/2007 |
| EP | 1882436 A1 | 1/2008 |
| EP | 1980193 A1 | 10/2008 |
| EP | 2127587 A1 | 2/2009 |
| EP | 2075366 A1 | 7/2009 |
| EP | 2138087 A1 | 12/2009 |
| EP | 2332457 A1 | 6/2011 |
| FR | 1370521 A | 8/1964 |
| FR | 2372363 A1 | 6/1978 |
| FR | 2491320 A1 | 4/1982 |
| FR | 2491321 A1 | 4/1982 |
| FR | 2790013 A1 | 8/2000 |
| GB | 973859 A | 10/1964 |
| GB | 1047948 | 11/1966 |
| GB | 1123789 A | 8/1968 |
| GB | 1515095 | 6/1978 |
| GB | 2274772 A | 8/1994 |
| JP | 55039215 A | 3/1980 |
| JP | 60069375 A | 4/1985 |
| JP | 61085991 A | 5/1986 |
| JP | 61200824 A | 9/1986 |
| JP | 1005521 A | 1/1989 |
| JP | 1080331 A | 3/1989 |
| JP | 5245094 A | 9/1993 |
| JP | 07178030 | 7/1995 |
| JP | 10109007 A | 4/1998 |
| JP | 2000107114 A | 4/2000 |
| JP | 2001190479 A | 7/2001 |
| JP | 2001190480 A | 7/2001 |
| JP | 2003336909 A | 12/2003 |
| JP | 2003339607 A | 12/2003 |
| JP | 2004267507 A | 9/2004 |
| JP | 2005124979 A | 5/2005 |
| JP | 2006075635 A | 3/2006 |
| JP | 2007068601 A | 3/2007 |
| JP | 2008093196 A | 4/2008 |
| JP | 2008253543 A | 10/2008 |
| JP | 2008264018 A | 11/2008 |
| JP | 2008264724 A | 11/2008 |
| JP | 2010035745 A | 2/2010 |
| JP | 2010187796 A | 9/2010 |
| KR | 20010077128 | 8/2001 |
| KR | 20090006659 | 1/2009 |
| WO | 2005058124 A1 | 6/2005 |
| WO | 2005115216 A1 | 12/2005 |
| WO | 2007024491 A2 | 3/2007 |
| WO | 2007074024 A1 | 7/2007 |
| WO | 2008067898 A1 | 6/2008 |
| WO | 2008125482 A2 | 10/2008 |
| WO | 2009018903 A1 | 2/2009 |
| WO | 2009065696 A1 | 5/2009 |
| WO | 2009077266 A1 | 6/2009 |
| WO | 2009077279 A2 | 6/2009 |
| WO | 2009077280 A1 | 6/2009 |
| WO | 2009077283 A1 | 6/2009 |
| WO | 2009077286 A1 | 6/2009 |
| WO | 2009077290 A1 | 6/2009 |
| WO | 2009118308 A1 | 10/2009 |

OTHER PUBLICATIONS

European Search Report for EP12188007, Aug. 6, 2013.
German Search Report for DE102010061347, Jan. 23, 2013.
German Search Report for DE102010061215, Feb. 7, 2013.
German Search Report for DE102010061346, Sep. 30, 2011.
German Search Report for DE102010061343, Jul. 7, 2011.
German Search Report for DE102011053666, Oct. 21, 2011.
German Search Report for DE102013103264, Jul. 12, 2013.
German Search Report for DE102013103625, Jul. 19, 2013.
German Search Report for Counterpart DE102013109125, Dec. 9, 2013.
German Search Report for DE102010061342, Aug. 19, 2011.
European Search Report for EP101952380, May 19, 2011.
Ishihara et al., JP 11155792 A, English Machine Translation, 1999, pp. 1-14.
German Search Report for Counterpart DE102014101260.7, Sep. 18, 2014.

* cited by examiner

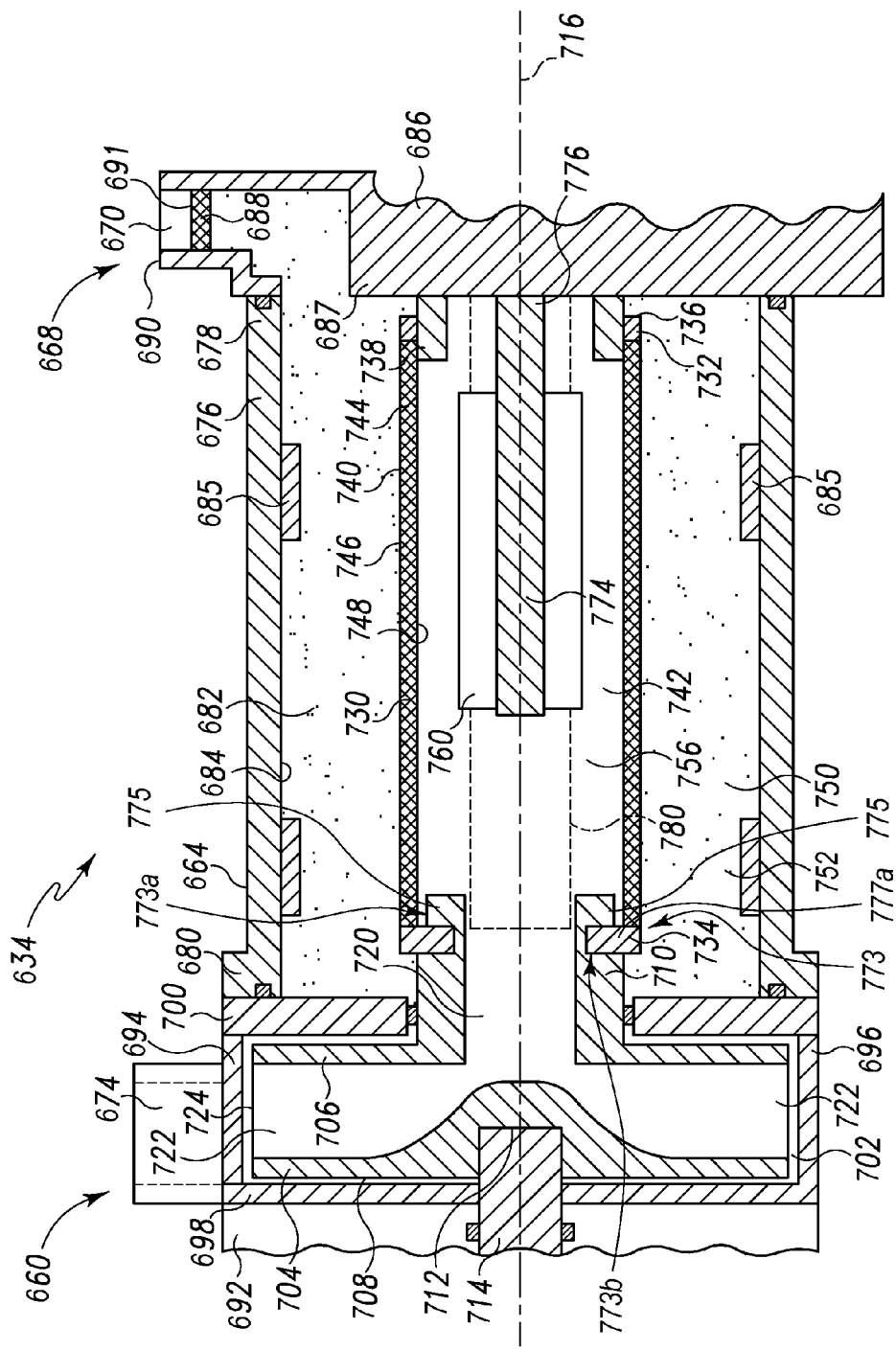

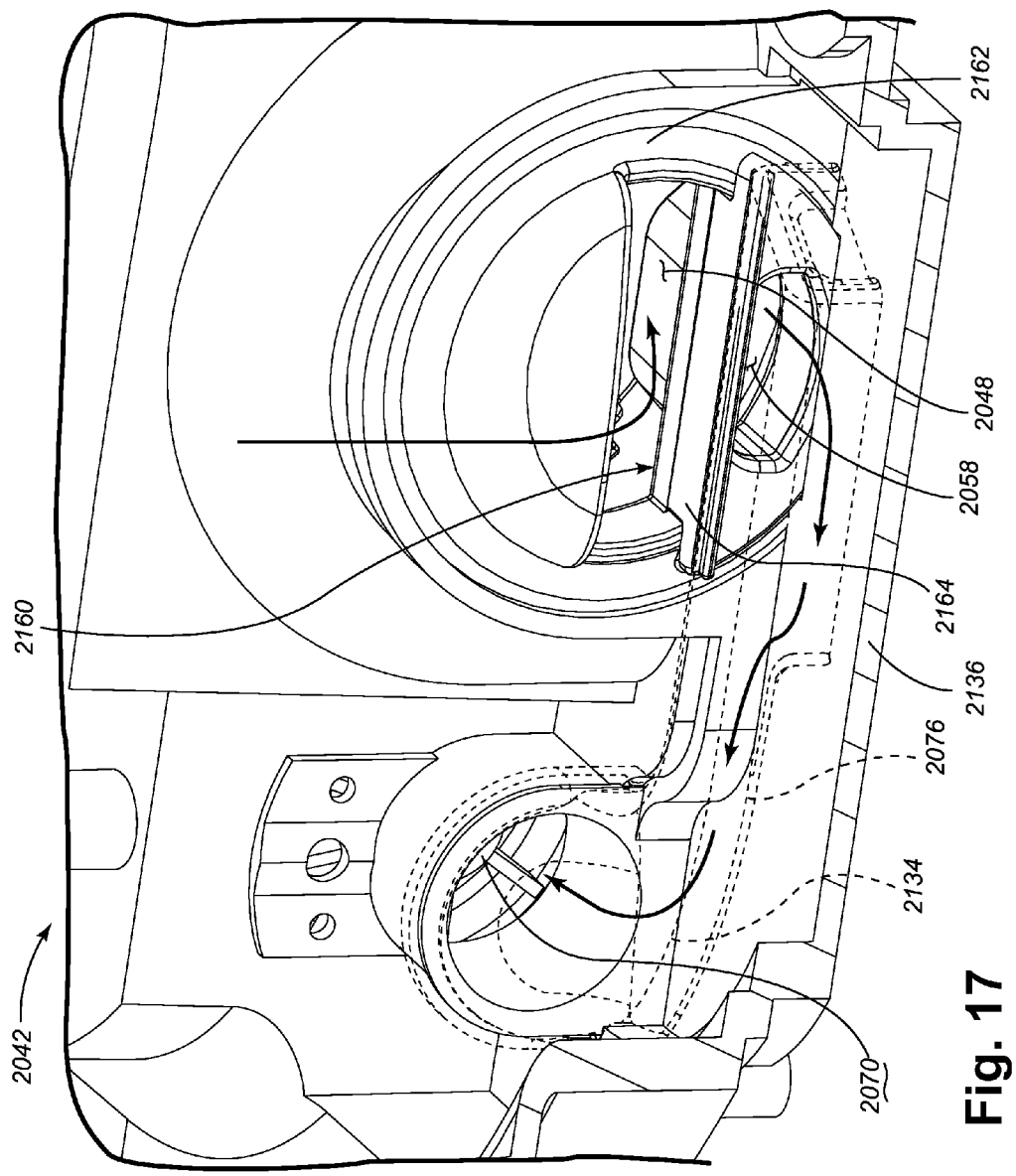

AUTOMATIC DISHWASHER WITH PUMP ASSEMBLY

CROSS-REFERENCE TO RELATED APPLICATIONS

The present application is a continuation-in-part of U.S. application Ser. No. 12/910,203, filed Oct. 22, 2010, which is a continuation-in-part of U.S. application Ser. No. 12/643,394, filed Dec. 21, 2009, now U.S. Pat. No. 8,746,261, issued Jun. 10, 2014, and both of which are incorporated by reference herein in their entirety.

BACKGROUND OF THE INVENTION

A dishwashing machine is a domestic appliance into which dishes and other cooking and eating wares (e.g., plates, bowls, glasses, flatware, pots, pans, bowls, etc.) are placed to be washed. A dishwashing machine includes various filters to separate soil particles from wash fluid. A pump assembly can be provided for recirculating and draining liquid from the sump.

SUMMARY OF THE INVENTION

In one aspect, an embodiment of the invention relates to an automatic dishwasher for treating dishes according to a cycle of operation, the dishwasher having a tub at least partially defining a treating chamber having a tub liquid outlet, a liquid spraying system supplying liquid to the treating chamber and a pump assembly that has a housing, defining a sump, and having an inlet fluidly coupled to the tub liquid outlet, a recirculation outlet fluidly coupled to the sprayer to define a liquid recirculation path from the sump to the sprayer, and a drain outlet that is adjacent the inlet, a wash pump fluidly coupled to the recirculation path to pump the liquid from the sump to the sprayer, and a drain pump having an inlet fluidly coupled to the drain outlet of the housing and an outlet configured to fluidly couple to a household drain.

BRIEF DESCRIPTION OF THE DRAWINGS

In the drawings:

FIGS. 9A-9C illustrate a pump and filter assembly having a bayonet mount assembly according to a fifth embodiment of the invention.

FIG. 17 is an enlarged perspective view of a portion of the pump assembly of FIG. 4 with portions shown in phantom for clarity.

DESCRIPTION OF EMBODIMENTS OF THE INVENTION

Figure 1:
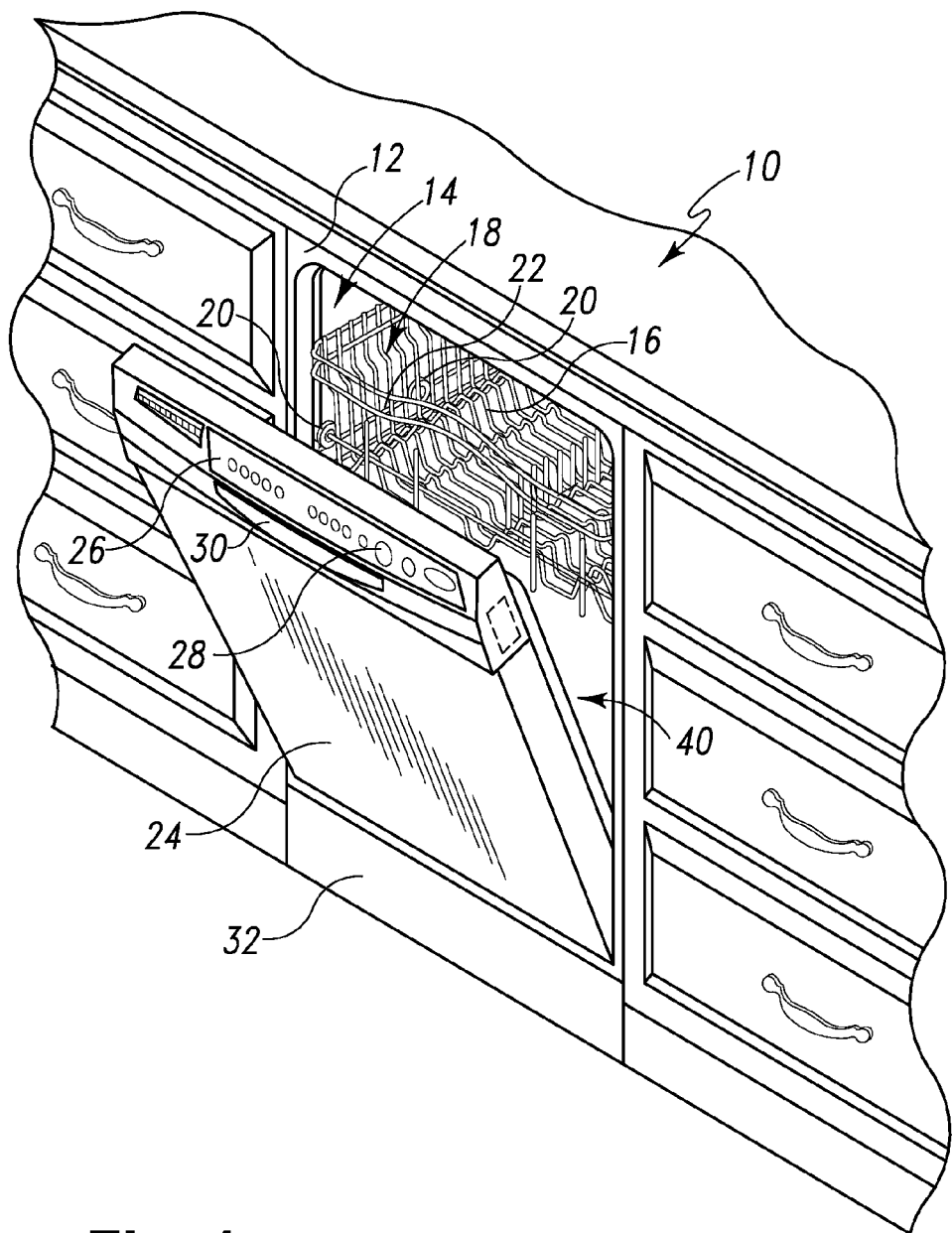
FIG. 1 is a perspective view of a dishwashing machine.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims. For example, while the present invention is described in terms of a conventional dishwashing unit, it could also be implemented in other types of dishwashing units, such as in-sink dishwashers or drawer-type dishwashers.

Referring to FIG. 1, a dishwashing machine 10 (hereinafter dishwasher 10) is shown. The dishwasher 10 has a tub 12 that defines a washing chamber 14 into which a user may place dishes and other cooking and eating wares (e.g., plates, bowls, glasses, flatware, pots, pans, bowls, etc.) to be washed. The dishwasher 10 includes a number of racks 16 located in the tub 12. An upper dish rack 16 is shown in FIG. 1, although a lower dish rack is also included in the dishwasher 10. A number of roller assemblies 18 are positioned between the dish racks 16 and the tub 12. The roller assemblies 18 allow the dish racks 16 to extend from and retract into the tub 12, which facilitates the loading and unloading of the dish racks 16. The roller assemblies 18 include a number of rollers 20 that move along a corresponding support rail 22.

A door 24 is hinged to the lower front edge of the tub 12. The door 24 permits user access to the tub 12 to load and unload the dishwasher 10. The door 24 also seals the front of the dishwasher 10 during a wash cycle. A control panel 26 is located at the top of the door 24. The control panel 26 includes a number of controls 28, such as buttons and knobs, which are used by a controller (not shown) to control the operation of the dishwasher 10. A handle 30 is also included in the control panel 26. The user may use the handle 30 to unlatch and open the door 24 to access the tub 12.

Figure 2:
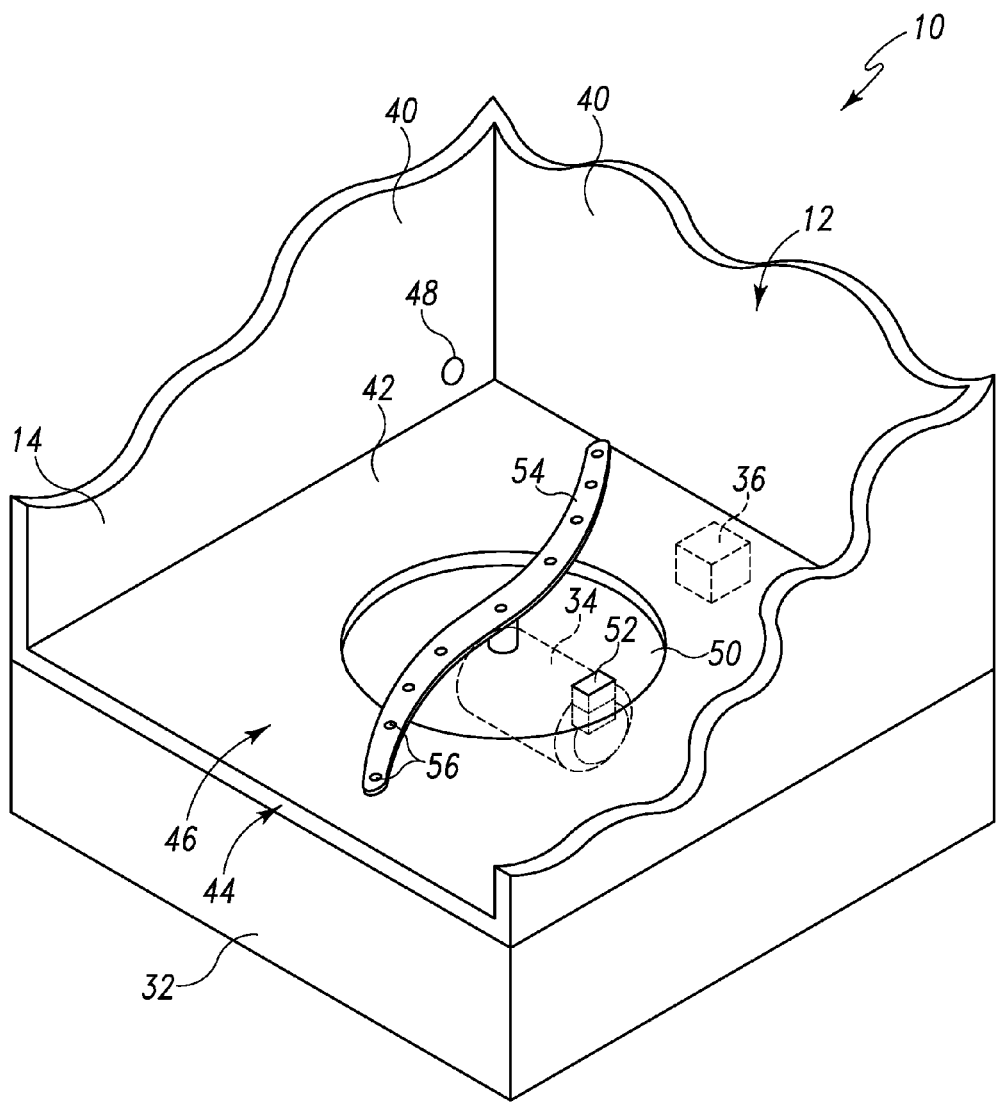
FIG. 2 is a fragmentary perspective view of the tub of the dishwashing machine of FIG. 1.

A machine compartment 32 is located below the tub 12. The machine compartment 32 is sealed from the tub 12. In other words, unlike the tub 12, which is filled with fluid and exposed to spray during the wash cycle, the machine compartment 32 does not fill with fluid and is not exposed to spray during the operation of the dishwasher 10. Referring now to FIG. 2, the machine compartment 32 houses a recirculation pump assembly 34 and the drain pump 36, as well as the dishwasher's other motor(s) and valve(s), along with the associated wiring and plumbing.

Referring now to FIG. 2, the tub 12 of the dishwasher 10 is shown in greater detail. The tub 12 includes a number of side walls 40 extending upwardly from a bottom wall 42 to define the washing chamber 14. The open front side 44 of the tub 12 defines an access opening 46 of the dishwasher 10. The access opening 46 provides the user with access to the dish racks 16 positioned in the washing chamber 14 when the door 24 is open. When closed, the door 24 seals the access opening 46, which prevents the user from accessing the dish racks 16. The door 24 also prevents fluid from escaping through the access opening 46 of the dishwasher 10 during a wash cycle.

The bottom wall 42 of the tub 12 has a sump 50 positioned therein. At the start of a wash cycle, fluid enters the tub 12 through a hole 48 defined in the side wall 40. The sloped configuration of the bottom wall 42 directs fluid into the sump 50. The recirculation pump assembly 34 removes such water and/or wash chemistry from the sump 50 through a hole 52 defined the bottom of the sump 50 after the sump 50 is partially filled with fluid.

The recirculation pump assembly 34 is fluidly coupled to a rotating spray arm 54 that sprays water and/or wash chemistry onto the dish racks 16 (and hence any wares positioned thereon). Additional rotating spray arms (not shown) are positioned above the spray arm 54. It should also be appreciated that the dishwashing machine 10 may include other spray arms positioned at various locations in the tub 12. As shown in FIG. 2, the spray arm 54 has a number of nozzles 56. Fluid passes from the recirculation pump assembly 34 into the spray arm 54 and then exits the spray arm 54 through the nozzles 56. In the illustrative embodiment described herein, the nozzles 56 are embodied simply as holes formed in the spray arm 54. However, it is within the scope of the disclosure for the nozzles 56 to include inserts such as tips or other similar structures that are placed into the holes formed in the spray arm 54. Such inserts may be useful in configuring the spray direction or spray pattern of the fluid expelled from the spray arm 54.

After wash fluid contacts the dish racks 16 and any wares positioned in the washing chamber 14, a mixture of fluid and soil falls onto the bottom wall 42 and collects in the sump 50. The recirculation pump assembly 34 draws the mixture out of the sump 50 through the hole 52. As will be discussed in detail below, fluid is filtered in the recirculation pump assembly 34 and re-circulated onto the dish racks 16. At the conclusion of the wash cycle, the drain pump 36 removes both wash fluid and soil particles from the sump 50 and the tub 12.

Figure 3:
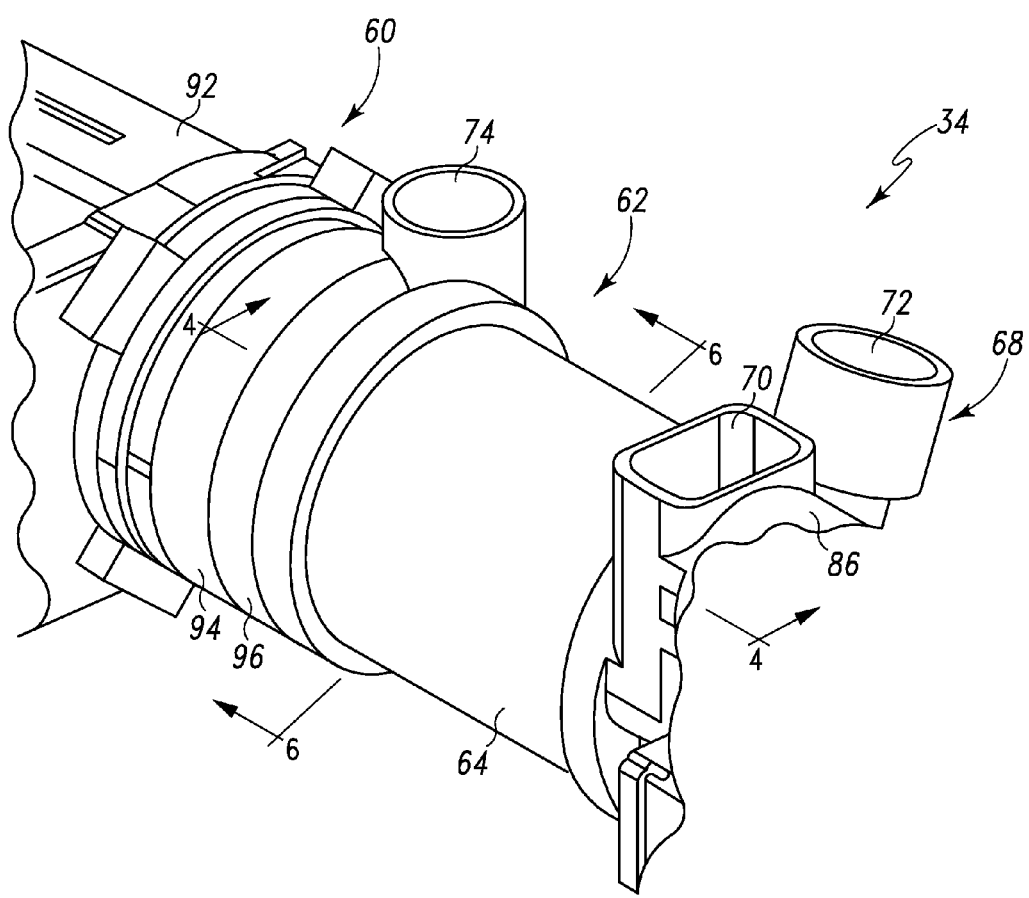
FIG. 3 is a perspective view of an embodiment of a pump and filter assembly for the dishwashing machine of FIG. 1.

Referring now to FIG. 3, the recirculation pump assembly 34 is shown removed from the dishwasher 10. The recirculation pump assembly 34 includes a wash pump 60 that is secured to a housing 62. The housing 62 includes cylindrical filter casing 64 positioned between a manifold 68 and the wash pump 60. The manifold 68 has an inlet port 70, which is fluidly coupled to the hole 52 defined in the sump 50, and an outlet port 72, which is fluidly coupled to the drain pump 36. Another outlet port 74 extends upwardly from the wash pump 60 and is fluidly coupled to the rotating spray arm 54. While recirculation pump assembly 34 is included in the dishwasher 10, it will be appreciated that in other embodiments, the recirculation pump assembly 34 may be a device separate from the dishwasher 10. For example, the recirculation pump assembly 34 might be positioned in a cabinet adjacent to the dishwasher 10. In such embodiments, a number of fluid hoses may be used to connect the recirculation pump assembly 34 to the dishwasher 10.

Figure 4:
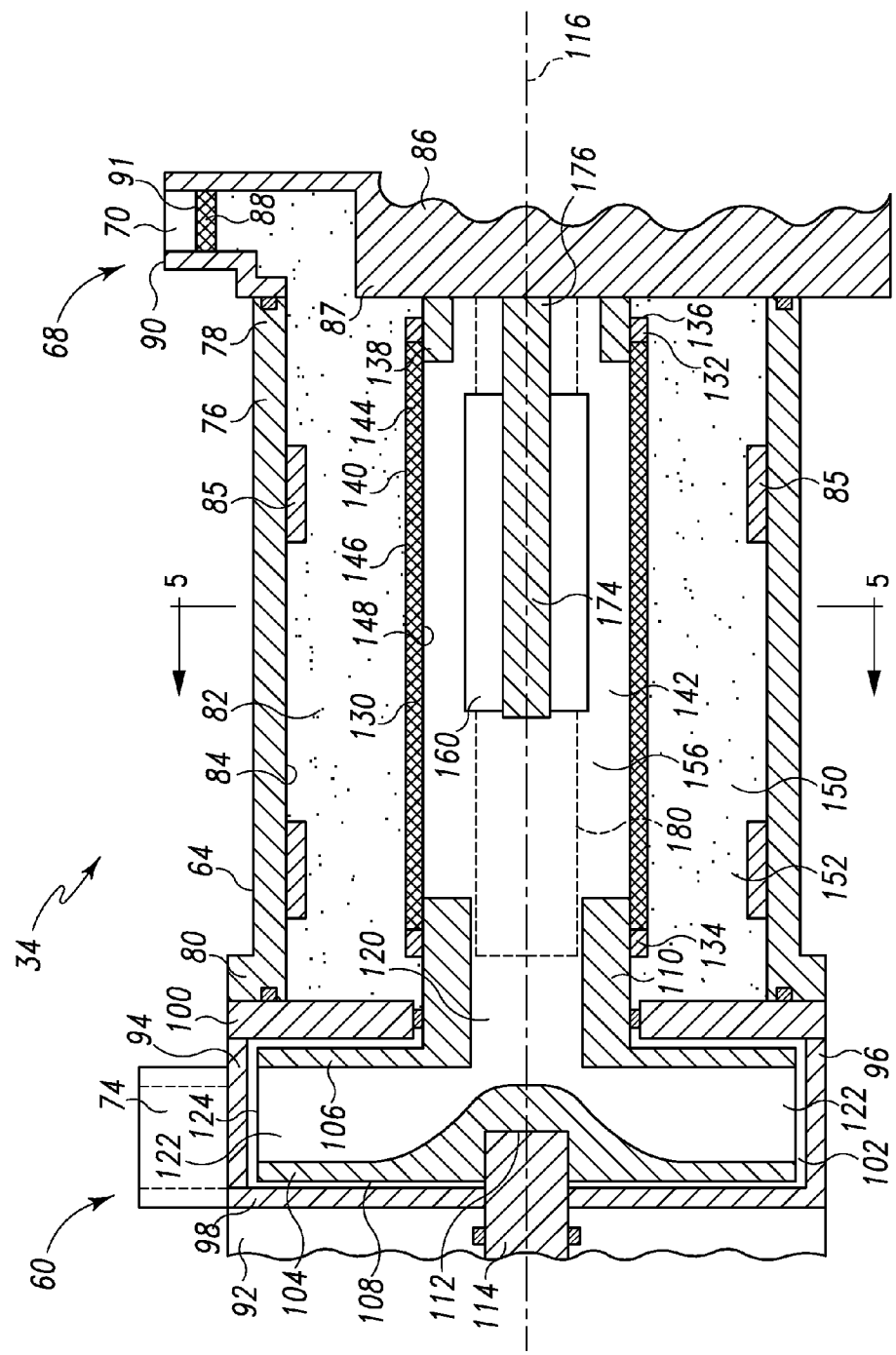
FIG. 4 is a cross-sectional view of the pump and filter assembly of FIG. 3 taken along the line 4-4 shown in FIG. 3.

Referring now to FIG. 4, a cross-sectional view of the recirculation pump assembly 34 is shown. The filter casing 64 is a hollow cylinder having a side wall 76 that extends from an end 78 secured to the manifold 68 to an opposite end 80 secured to the wash pump 60. The side wall 76 defines a filter chamber 82 that extends the length of the filter casing 64.

The side wall 76 has an inner surface 84 facing the filter chamber 82. A number of rectangular ribs 85 extend from the inner surface 84 into the filter chamber 82. The ribs 85 are configured to create drag to counteract the movement of fluid within the filter chamber 82. It should be appreciated that in other embodiments, each of the ribs 85 may take the form of a wedge, cylinder, pyramid, or other shape configured to create drag to counteract the movement of fluid within the filter chamber 82.

The manifold 68 has a main body 86 that is secured to the end 78 of the filter casing 64. The inlet port 70 extends upwardly from the main body 86 and is configured to be coupled to a fluid hose (not shown) extending from the hole 52 defined in the sump 50. The inlet port 70 opens through a sidewall 87 of the main body 86 into the filter chamber 82 of the filter casing 64. As such, during the wash cycle, a mixture of fluid and soil particles advances from the sump 50 into the filter chamber 82 and fills the filter chamber 82. As shown in FIG. 4, the inlet port 70 has a filter screen 88 positioned at an upper end 90. The filter screen 88 has a plurality of holes 91 extending there through. Each of the holes 91 is sized such that large soil particles are prevented from advancing into the filter chamber 82.

A passageway (not shown) places the outlet port 72 of the manifold 68 in fluid communication with the filter chamber 82. When the drain pump 36 is energized, fluid and soil particles from the sump 50 pass downwardly through the inlet port 70 into the filter chamber 82. Fluid then advances from the filter chamber 82 through the passageway and out the outlet port 72.

The wash pump 60 is secured at the opposite end 80 of the filter casing 64. The wash pump 60 includes a motor 92 (see FIG. 3) secured to a cylindrical pump housing 94. The pump housing 94 includes a side wall 96 extending from a base wall 98 to an end wall 100. The base wall 98 is secured to the motor 92 while the end wall 100 is secured to the end 80 of the filter casing 64. The walls 96, 98, 100 define an impeller chamber 102 that fills with fluid during the wash cycle. As shown in FIG. 4, the outlet port 74 is coupled to the side wall 96 of the pump housing 94 and opens into the chamber 102. The outlet port 74 is configured to receive a fluid hose (not shown) such that the outlet port 74 may be fluidly coupled to the spray arm 54.

The wash pump 60 also includes an impeller 104. The impeller 104 has a shell 106 that extends from a back end 108 to a front end 110. The back end 108 of the shell 106 is positioned in the chamber 102 and has a bore 112 formed therein. A drive shaft 114, which is rotatably coupled to the motor 92, is received in the bore 112. The motor 92 acts on the drive shaft 114 to rotate the impeller 104 about an imaginary axis 116 in the direction indicated by arrow 118 (see FIG. 5). The motor 92 is connected to a power supply (not shown), which provides the electric current necessary for the motor 92 to spin the drive shaft 114 and rotate the impeller 104. In the illustrative embodiment, the motor 92 is configured to rotate the impeller 104 about the axis 116 at 3200 rpm.

The front end 110 of the impeller shell 106 is positioned in the filter chamber 82 of the filter casing 64 and has an inlet opening 120 formed in the center thereof. The shell 106 has a number of vanes 122 that extend away from the inlet opening 120 to an outer edge 124 of the shell 106. The rotation of the impeller 104 about the axis 116 draws fluid from the filter chamber 82 of the filter casing 64 into the inlet opening 120. The fluid is then forced by the rotation of the impeller 104 outward along the vanes 122. Fluid exiting the impeller 104 is advanced out of the chamber 102 through the outlet port 74 to the spray arm 54.

As shown in FIG. 4, the front end 110 of the impeller shell 106 is coupled to a rotary filter 130 positioned in the filter chamber 82 of the filter casing 64. The filter 130 has a cylindrical filter drum 132 extending from an end 134 secured to the impeller shell 106 to an end 136 rotatably coupled to a bearing 138, which is secured the main body 86 of the manifold 68. As such, the filter 130 is operable to rotate about the axis 116 with the impeller 104.

A filter sheet 140 extends from one end 134 to the other end 136 of the filter drum 132 and encloses a hollow interior 142. The sheet 140 includes a number of holes 144, and each hole 144 extends from an outer surface 146 of the sheet 140 to an inner surface 148. In the illustrative embodiment, the sheet 140 is a sheet of chemically etched metal. Each hole 144 is sized to allow for the passage of wash fluid into the hollow interior 142 and prevent the passage of soil particles.

As such, the filter sheet 140 divides the filter chamber 82 into two parts. As wash fluid and removed soil particles enter the filter chamber 82 through the inlet port 70, a mixture 150 of fluid and soil particles is collected in the filter chamber 82 in a region 152 external to the filter sheet 140. Because the holes 144 permit fluid to pass into the hollow interior 142, a volume of filtered fluid 156 is formed in the hollow interior 142.

Figure 5:
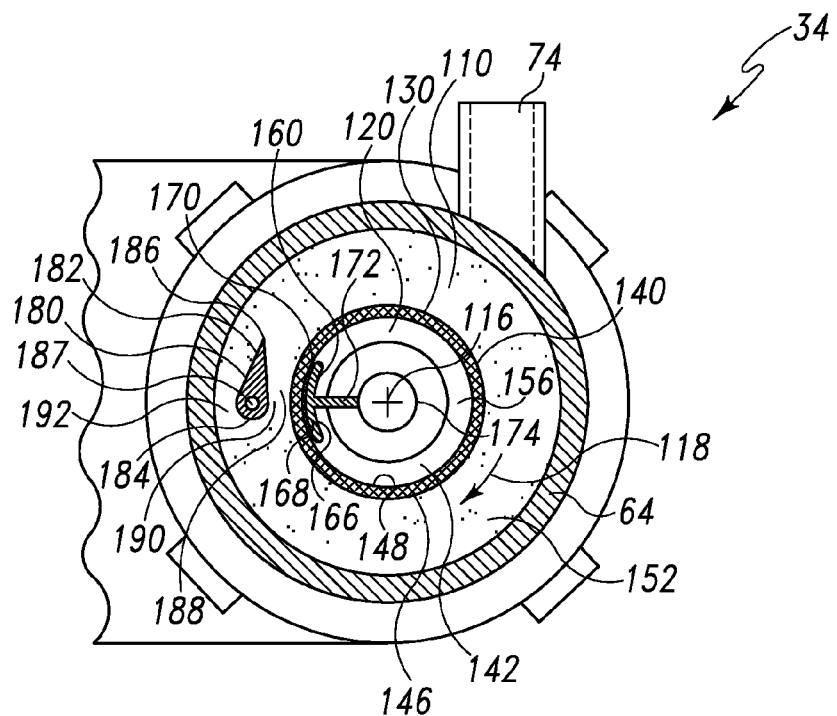
FIG. 5 is a cross-sectional view of the pump and filter assembly of FIG. 3 taken along the line 5-5 shown in FIG. 4 showing the rotary filter with two flow diverters.

Referring now to FIGS. 4 and 5, a flow diverter 160 is positioned in the hollow interior 142 of the filter 130. The diverter 160 has a body 166 that is positioned adjacent to the inner surface 148 of the sheet 140. The body 166 has an outer surface 168 that defines a circular arc 170 having a radius smaller than the radius of the sheet 140. A number of arms 172 extend away from the body 166 and secure the diverter 160 to a beam 174 positioned in the center of the filter 130. As best seen in FIG. 4, the beam 174 is coupled at an end 176 to the side wall 87 of the manifold 68. In this way, the beam 174 secures the body 166 to the housing 62.

Another flow diverter 180 is positioned between the outer surface 146 of the sheet 140 and the inner surface 84 of the housing 62. The diverter 180 has a fin-shaped body 182 that extends from a leading edge 184 to a trailing end 186. As shown in FIG. 4, the body 182 extends along the length of the filter drum 132 from one end 134 to the other end 136. It will be appreciated that in other embodiments, the diverter 180 may take other forms, such as, for example, having an inner surface that defines a circular arc having a radius larger than the radius of the sheet 140. As shown in FIG. 5, the body 182 is secured to a beam 184. The beam 187 extends from the side wall 87 of the manifold 68. In this way, the beam 187 secures the body 182 to the housing 62.

As shown in FIG. 5, the diverter 180 is positioned opposite the diverter 160 on the same side of the filter chamber 82. The diverter 160 is spaced apart from the diverter 180 so as to create a gap 188 therebetween. The sheet 140 is positioned within the gap 188.

In operation, wash fluid, such as water and/or wash chemistry (i.e., water and/or detergents, enzymes, surfactants, and other cleaning or conditioning chemistry), enters the tub 12 through the hole 48 defined in the side wall 40 and flows into the sump 50 and down the hole 52 defined therein. As the filter chamber 82 fills, wash fluid passes through the holes 144 extending through the filter sheet 140 into the hollow interior 142. After the filter chamber 82 is completely filled and the sump 50 is partially filled with wash fluid, the dishwasher 10 activates the motor 92.

Activation of the motor 92 causes the impeller 104 and the filter 130 to rotate. The rotation of the impeller 104 draws wash fluid from the filter chamber 82 through the filter sheet 140 and into the inlet opening 120 of the impeller shell 106. Fluid then advances outward along the vanes 122 of the impeller shell 106 and out of the chamber 102 through the outlet port 74 to the spray arm 54. When wash fluid is delivered to the spray arm 54, it is expelled from the spray arm 54 onto any dishes or other wares positioned in the washing chamber 14. Wash fluid removes soil particles located on the dishwares, and the mixture of wash fluid and soil particles falls onto the bottom wall 42 of the tub 12. The sloped configuration of the bottom wall 42 directs that mixture into the sump 50 and down the hole 52 defined in the sump 50.

While fluid is permitted to pass through the sheet 140, the size of the holes 144 prevents the soil particles of the mixture 152 from moving into the hollow interior 142. As a result, those soil particles accumulate on the outer surface 146 of the sheet 140 and cover the holes 144, thereby preventing fluid from passing into the hollow interior 142.

The rotation of the filter 130 about the axis 116 causes the mixture 150 of fluid and soil particles within the filter chamber 82 to rotate about the axis 116 in the direction indicated by the arrow 118. Centrifugal force urges the soil particles toward the side wall 76 as the mixture 150 rotates about the axis 116. The diverters 160, 180 divide the mixture 150 into a first portion 190, which advances through the gap 188, and a second portion 192, which bypasses the gap 188. As the portion 190 advances through the gap 188, the angular velocity of the portion 190 increases relative to its previous velocity as well as relative to the second portion 192. The increase in angular velocity results in a low pressure region between the diverters 160, 180. In that low pressure region, accumulated soil particles are lifted from the sheet 140, thereby, cleaning the sheet 140 and permitting the passage of fluid through the holes 144 into the hollow interior 142. Additionally, the acceleration accompanying the increase in angular velocity as the portion 190 enters the gap 188 provides additional force to lift the accumulated soil particles from the sheet 140.

Figure 6:
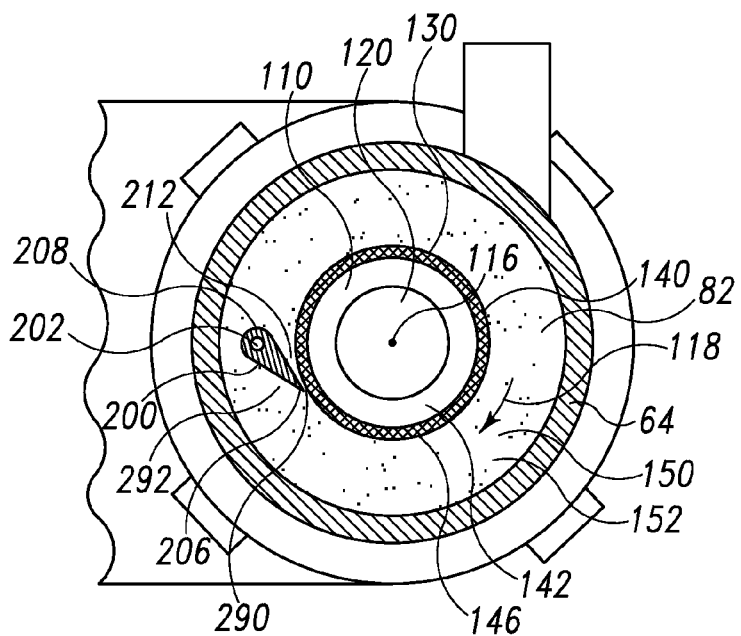
FIG. 6 is a cross-sectional view of the pump and filter assembly of FIG. 3 taken along the line 6-6 shown in FIG. 3 showing a second embodiment of the rotary filter with a single flow diverter.

Referring now to FIG. 6, a cross-section of a second embodiment of the rotary filter 130 with a single flow diverter 200. The diverter 200, like the diverter 180 of the embodiment of FIGS. 1-5, is positioned within the filter chamber 82 external of the hollow interior 142. The diverter 200 is secured to the side wall 87 of the manifold 68 via a beam 202. The diverter 200 has a fin-shaped body 204 that extends from a tip 206 to a trailing end 208. The tip 206 has a leading edge 210 that is positioned proximate to the outer surface 146 of the sheet 140, and the tip 206 and the outer surface 146 of the sheet 140 define a gap 212 therebetween.

In operation, the rotation of the filter 130 about the axis 116 causes the mixture 150 of fluid and soil particles to rotate about the axis 116 in the direction indicated by the arrow 118. The diverter 200 divides the mixture 150 into a first portion 290, which passes through the gap 212 defined between the diverter 200 and the sheet 140, and a second portion 292, which bypasses the gap 212. As the first portion 290 passes through the gap 212, the angular velocity of the first portion 290 of the mixture 150 increases relative to the second portion 292. The increase in angular velocity results in low pressure in the gap 212 between the diverter 200 and the outer surface 146 of the sheet 140. In that low pressure region, accumulated soil particles are lifted from the sheet 140 by the first portion 290 of the fluid, thereby cleaning the sheet 140 and permitting the passage of fluid through the holes 144 into the hollow interior 142. In some embodiments, the gap 212 is sized such that the angular velocity of the first portion 290 is at least sixteen percent greater than the angular velocity of the second portion 292 of the fluid.

Figure 7:
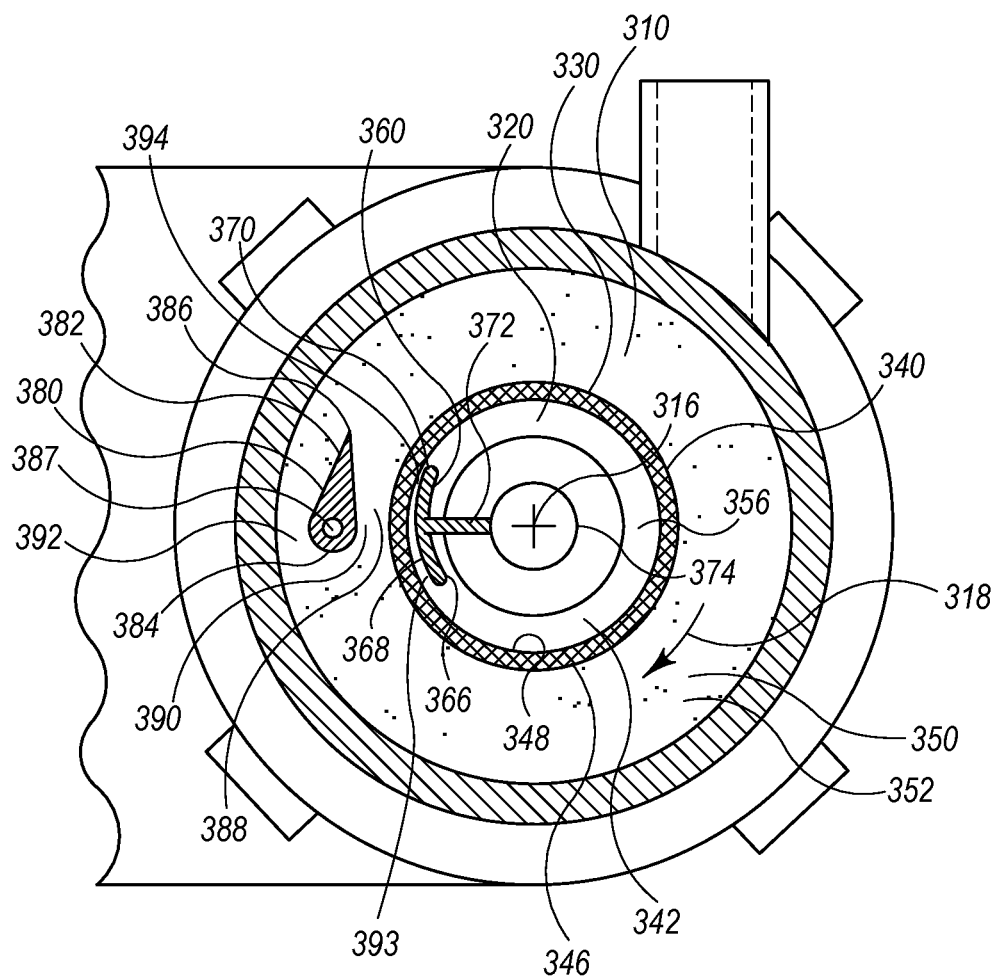
FIG. 7 is a cross-sectional elevation view of the pump and filter assembly of FIG. 3 similar to FIG. 5 and illustrating a third embodiment of the rotary filter with two flow diverters.

FIG. 7 illustrates a third embodiment of the rotary filter 330 with two flow diverters 360 and 380. The third embodiment is similar to the first embodiment having two flow diverters 160 and 180 as illustrated in FIGS. 1-5. Therefore, like parts will be identified with like numerals increased by 200, with it being understood that the description of the like parts of the first embodiment applies to the third embodiment, unless otherwise noted.

One difference between the first embodiment and the third embodiment is that the flow diverter 360 has a body 366 with an outer surface 368 that is less symmetrical than that of the first embodiment 360. More specifically, the body 366 is shaped in such a manner that a leading gap 393 is formed when the body 366 is positioned adjacent to the inner surface 348 of the sheet 340. A trailing gap 394, which is smaller than the leading gap 393, is also formed when the body 366 is positioned adjacent to the inner surface 348 of the sheet 340.

The third embodiment operates much the same way as the first embodiment. That is, the rotation of the filter 330 about the axis 316 causes the mixture 350 of fluid and soil particles to rotate about the axis 316 in the direction indicated by the arrow 318. The diverters 360, 380 divide the mixture 350 into a first portion 390, which advances through the gap 388, and a second portion 392, which bypasses the gap 388. The orientation of the body 366 such that it has a larger leading gap 393 that reduces to a smaller trailing gap 394 results in a decreasing cross-sectional area between the outer surface 368 of the body 366 and the inner surface 348 of the filter sheet 340 along the direction of fluid flow between the body 366 and the filter sheet 340, which creates a wedge action that forces water from the hollow interior 342 through a number of holes 344 to the outer surface 346 of the sheet 340. Thus, a backflow is induced by the leading gap 393. The backwash of water against accumulated soil particles on the sheet 340 better cleans the sheet 340.

Figure 8:
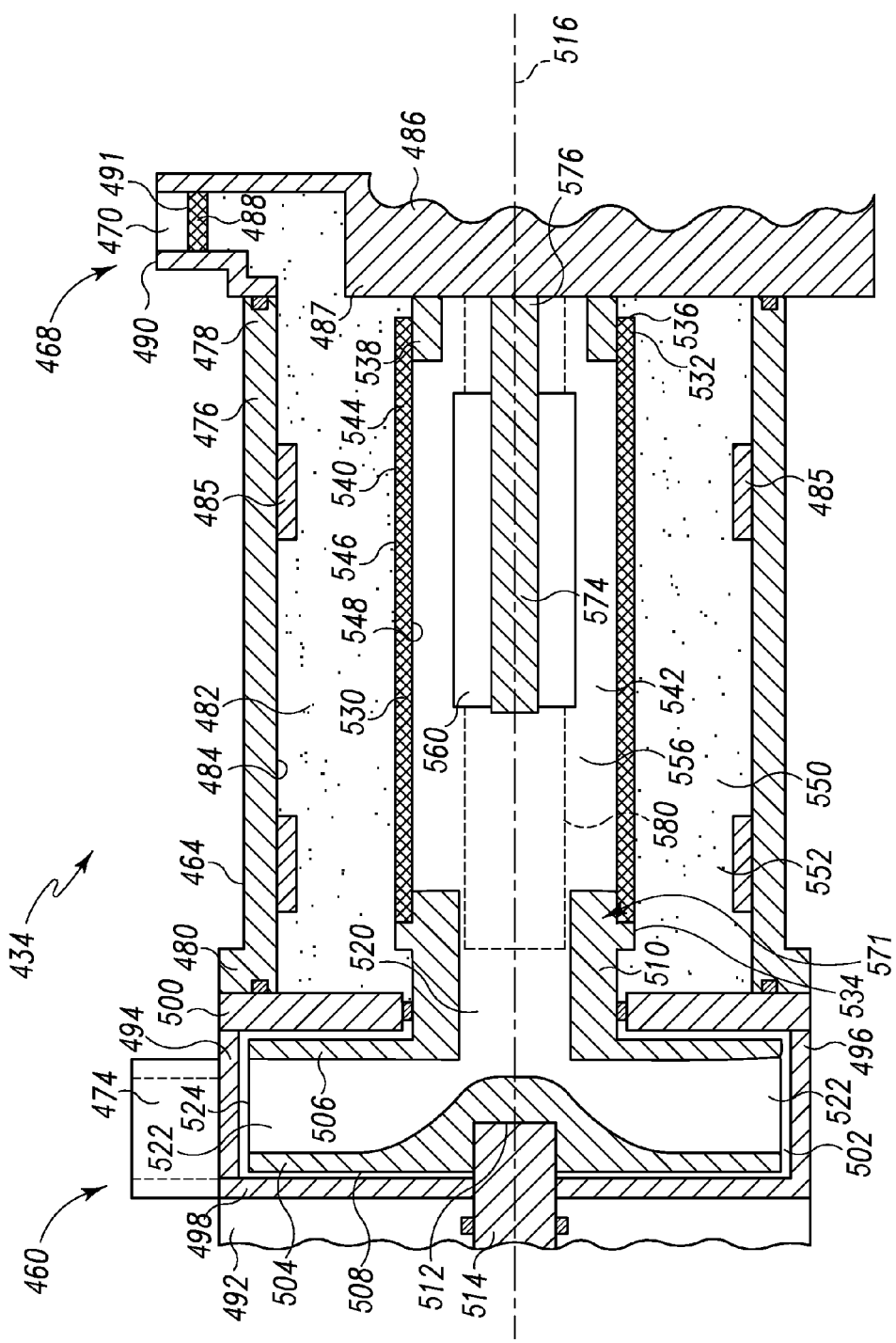
FIG. 8 is a cross-sectional view of a pump and filter assembly similar to FIG. 4 and illustrating a fourth embodiment of the invention.

FIG. 8 illustrates a fourth embodiment of a pump assembly 434 and a rotary filter 540. The fourth embodiment is similar to the first embodiment as illustrated in FIGS. 1-5. Therefore, like parts will be identified with like numerals increased by 400, with it being understood that the description of the like parts of the first embodiment applies to the fourth embodiment, unless otherwise noted.

One difference between the first embodiment and the fourth embodiment is that the front end 510 of the impeller shell 506 and the one end 534 of the rotary filter 530 are a singular piece 571. Such a singular piece 571 may be formed through injection molding. With the impeller shell 506 and the one end 534 of the rotary filter 530 being a singular piece 570 it will be appreciated that the movement of the impeller 504 causes the filter 530 to rotate and that the filter 530 rotates at the same speed about the axis 516 as the impeller 504.

Figure 9B:
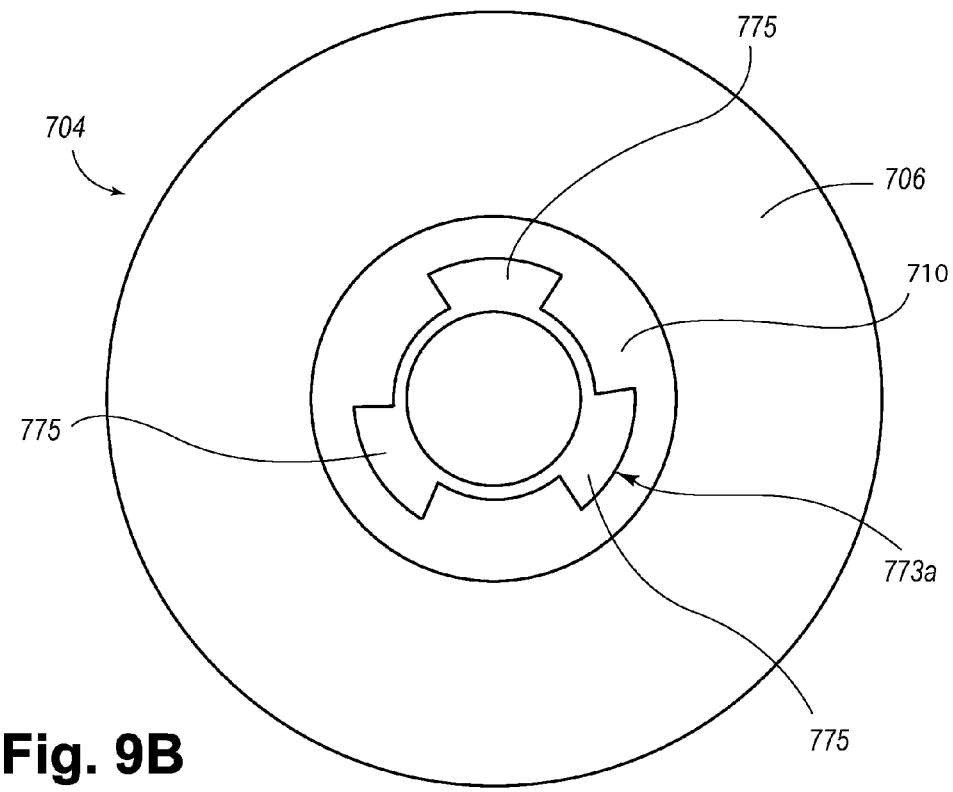
Figure 9C:
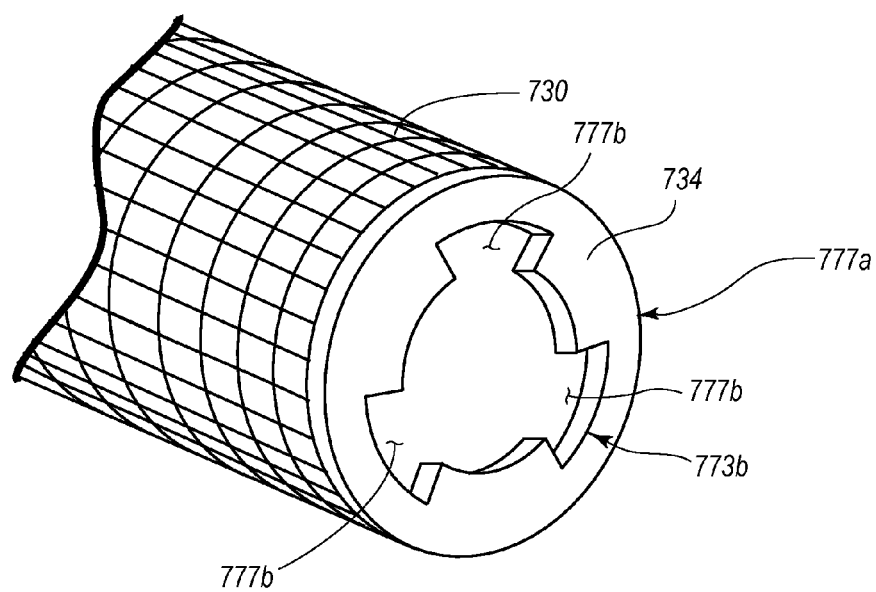

FIGS. 9A-9C illustrate a fifth embodiment of a pump assembly 634 and a rotary filter 740. The fifth embodiment is similar to the first embodiment as illustrated in FIGS. 1-5. Therefore, like parts will be identified with like numerals increased by 600, with it being understood that the description of the like parts of the first embodiment applies to the fifth embodiment, unless otherwise noted.

One difference between the first embodiment and the fifth embodiment is that the impeller 704 and the rotary filter 730 are coupled together with a bayonet mount 773 as illustrated in FIG. 9A. More specifically, the impeller shell 706 includes a male side 773a of the bayonet mount 773 and the rotary filter 730 includes a female side 773b of the bayonet mount 773, which is shaped in a manner to receive the male side 773a. The male side 773a includes a number of lugs 775 projecting from and spaced slightly from the front end 710 of the impeller shell 706. The female side 773b includes a plate 777a extending radially inward from the end 734 of the rotary filter 730.

Preferably, the female side 773b of the rotary filter 730 and male side 773a of the impeller 704 are fastened in the same direction as rotation of the impeller 704 and filter 730. In this manner, the bayonet mount 773 will not unfasten during rotation of the impeller 704 and filter 730. Alternatively, a locking mechanism or pin (not shown) may be inserted to hold the bayonet mount 773 in place during rotation of the impeller 704 and filter 730. With the impeller shell 706 and the one end 734 of the rotary filter 730 being coupled together with the bayonet mount 773 it will be appreciated that the movement of the impeller 704 causes the filter 730 to rotate and that the filter 730 rotates at the same speed about the axis 716 as the impeller 704.

FIG. 9B illustrates the male side 773a of the bayonet mount 773. As can be more clearly seen, the male side 773a includes a number of lugs 775 projecting from its front end 710. Although three lugs 775 have been illustrated, it has been contemplated that alternative numbers of lugs 775 may be used.

FIG. 9C illustrates more clearly the female side 773b of the bayonet mount 773. The plate 777a is illustrated as having several slots 777b corresponding to the lugs 775 on the male side 773a. The slots 777b of the female side 773b are slightly larger than the corresponding lugs 775 of the male side 773a such that the lugs 775 may fit into the appropriately sized slots 777b. Once the lugs 775 are inserted into the slots 777b the rotary filter 730 may be fastened to the impeller 704 by turning it a small amount such that the lugs 775 are located behind the plate 777a (FIG. 9A).

Figure 10A:
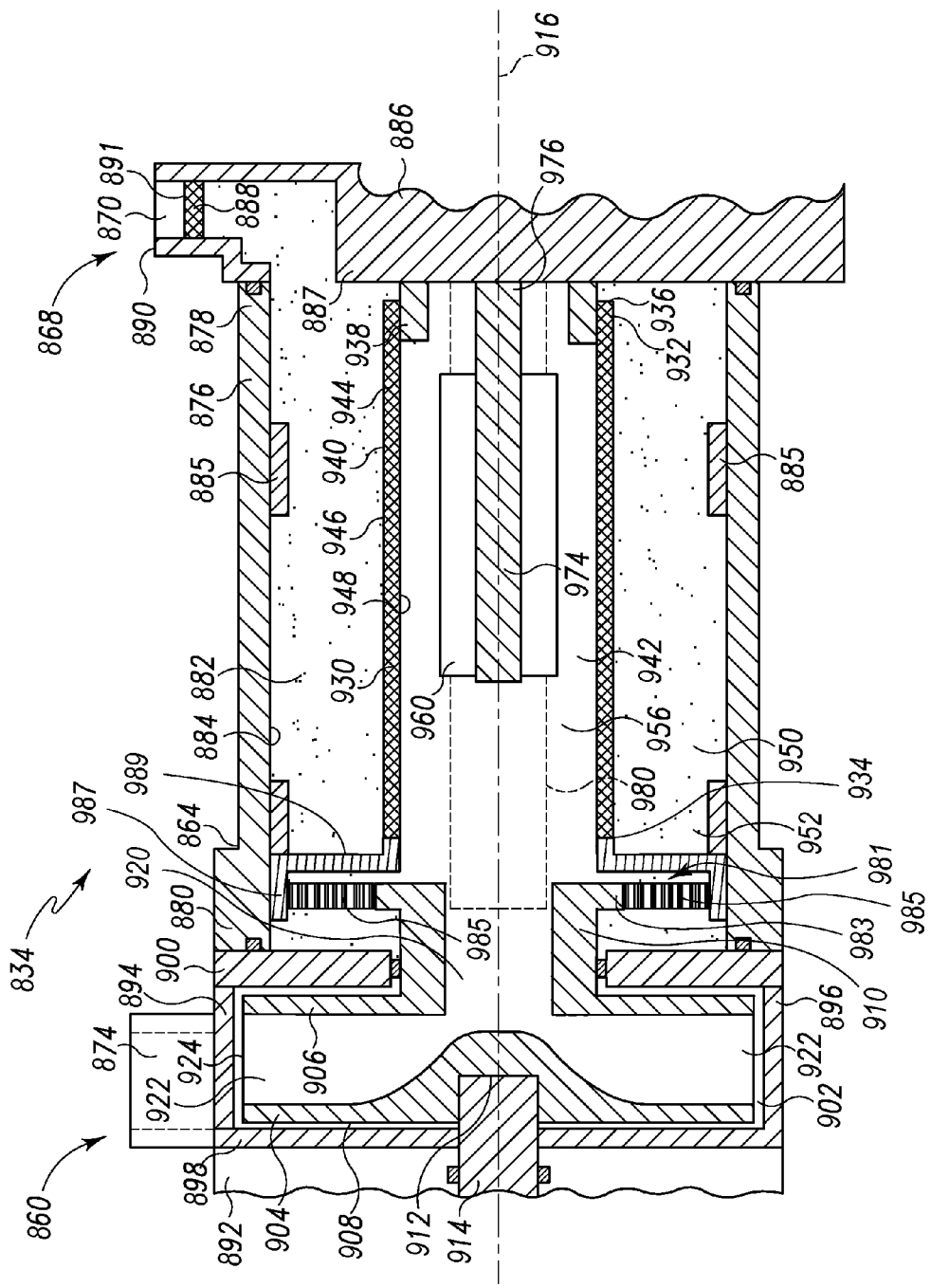
FIGS. 10A-10B illustrate a pump and filter assembly having a reduction gear assembly according to a sixth embodiment of the invention.
Figure 10B:
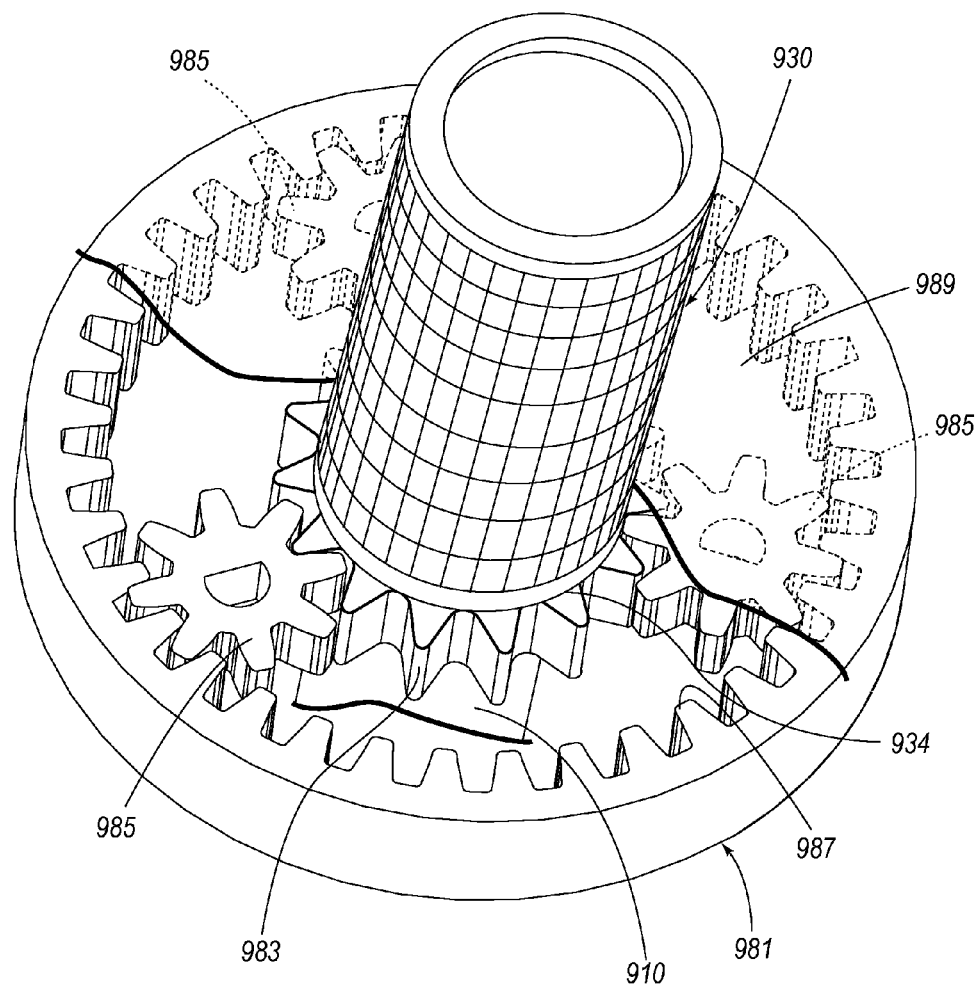

FIGS. 10A and 10B illustrate a sixth embodiment of a pump assembly 834 and a rotary filter 930. The sixth embodiment is similar to the first embodiment as illustrated in FIGS. 1-5. Therefore, like parts will be identified with like numerals increased by 800, with it being understood that the description of the like parts of the first embodiment applies to the sixth embodiment, unless otherwise noted.

Referring to FIG. 10A, one difference between the first embodiment and the sixth embodiment is that the impeller 904 and the rotary filter 930 are coupled together through a speed adjuster. As illustrated, the speed adjuster is a speed reducer illustrated as a drive assembly 981. The drive assembly 981 is composed of the front end 910 of the impeller 904, which acts as a drive shaft, a drive gear 983, idler gears 985, and a ring gear 987 having a support 989. The drive gear 983, idler gears 985, and ring gear 987 all form the speed adjuster and may be selected such that they alter the rotational speed of the filter 930 from that of the impeller 904. As the speed adjuster illustrated in FIG. 10A is a speed reducer the drive assembly 981 is assembled such that the filter 930 is rotated at a speed slower than the rotational speed of the impeller 904.

The front end 910 is operably coupled to the drive gear 983. The ring gear 987 may have a support 989 extending from it. The support 989 may be operably coupled to the end 934 of the rotary filter 930 such that movement of the ring gear 987 and the support 989 may be transferred to the rotary filter 930.

Referring to FIG. 10B, the drive gear 983 is enmeshed with the idler gears 985, which are in turn enmeshed with an outer ring gear 987. Thus, in operation, activation of the motor 892 causes the impeller 904 to rotate. The rotation of the impeller 904 in turn causes the drive gear 983 to rotate because the drive gear 983 is operably coupled to the impeller. As the drive gear 983 is rotated, the idler gears 985 are rotated and they in turn rotate the ring gear 987, which causes the filter 930 to rotate as it is mounted to the support 989 on the ring gear 987.

As the rotational speed of the impeller is relatively high (3000 rpm or higher), it is contemplated that the gear chain will form a gear reduction such that it forms a speed reducer and one rotation of the impeller 904 results in less than a full rotation of the rotary filter 930. Although the gear assembly shown is an epicyclical gear assembly; it has been contemplated that other types of gear assemblies could be used. Further, the speed adjuster may also include a speed increaser operably coupling the filter 930 to the impeller 904 such that when the impeller 904 is rotated that filter 930 is rotated at a faster speed than the impeller 904. For example, a swapping of the ring gear 987 and the drive gear 983 could provide a speed increaser, where the filter rotates faster than the impeller.

Figure 11A:
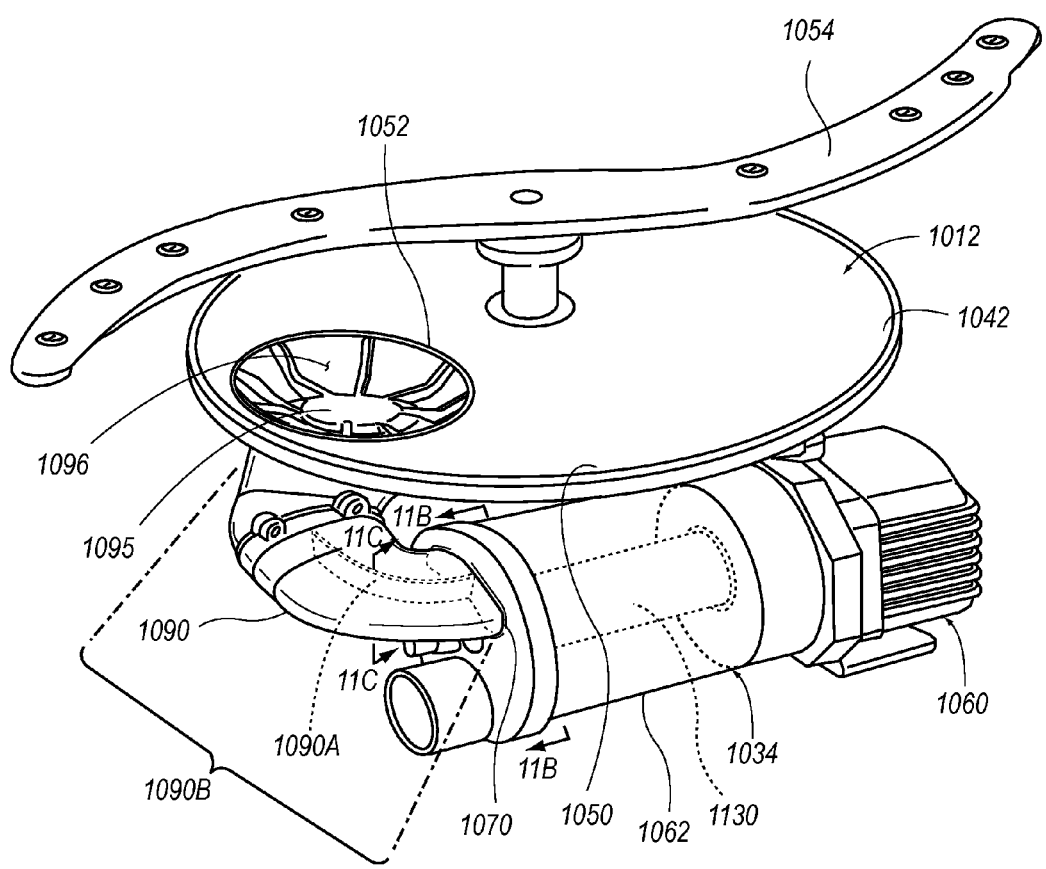
FIG. 11A is a perspective view of the sump, spray arm assembly, and pump assembly according to a seventh embodiment and removed from the dishwashing machine of FIG. 1 for clarity.

FIG. 11A illustrates a sump 1050, spray arm assembly 1054, and pump assembly 1034 according to a seventh embodiment removed from the dishwashing machine for clarity. The seventh embodiment is similar to the first embodiment as illustrated in FIGS. 1-5. Therefore, like parts will be identified with like numerals increased by 1000, with it being understood that the description of the like parts of the first embodiment applies to the seventh embodiment, unless otherwise noted.

As can be seen in FIG. 11A, a portion of the bottom wall 1042 of the tub 1012 has a sump 1050 positioned therein. An outlet 1052 defined in the sump 1050 leads to a conduit 1090. The outlet 1052 is illustrated as a cup with an open top and bottom. A pump hood or grate 1095 is located in the outlet 1052 forming the inlet of the conduit 1090. The conduit 1090 extends downwardly to an inlet port 1070 of the housing 1062 and thus fluidly couples the tub 1012 to the housing 1062. A recirculation pump assembly 1034 having a wash pump 1060 is secured to the housing 1062.

The grate 1095 has a plurality of openings 1096, which are sized such that large debris particles such as utensils, toothpicks, screws, etc. are prevented from advancing into the conduit 1090. The plurality of openings 1096 have a total cross-sectional area of about 1800 sq. mm and this provides an adequate flow rates to the wash pump 1060 that range from 25-50 liters per minute. The grate 1095 and its plurality of openings 1096 are sized and shaped so as to provide substantially non-turbulent liquid flow to the conduit 1090. More specifically, the grate 1095 eliminates any vortexes which may otherwise be formed in the conduit 1090. The grate 1095 creates a more laminar flow of liquid and decreases the turbulence of the liquid entering the conduit 1090. In this manner, the grate 1095 allows air to escape the liquid and minimizes air entrainment in the liquid. This is important as air which is entrained in the liquid reduces the efficiency of the wash pump 1060.

Figure 11B:
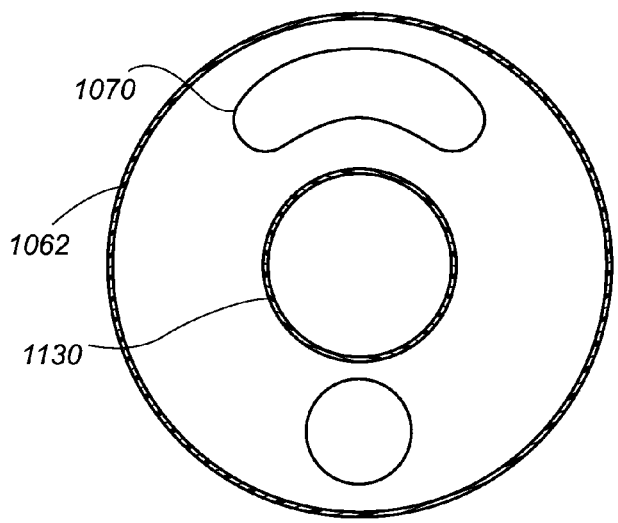
FIG. 11B is a cross-sectional view of an end of the pump assembly illustrated in FIG. 11A.

FIG. 11B illustrates an interior cross-sectional view of the end of the pump assembly 1034 where the inlet port 1070 is located. The inlet port 1070 has been illustrated as having an oblong or kidney shape. The shape of the inlet port 1070 allows liquid to enter into the chamber created by the housing 1062 outside of the rotary filter 1130 positioned therein. This allows the filter 1130 to be fluidly disposed between the inlet port 1070 and the wash pump 1060.

Figure 11C:
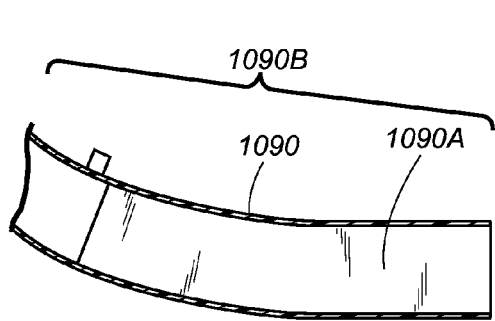
FIG. 11C is a cross-sectional view of the conduit illustrated in FIG. 11A.

Referring now to FIG. 11C, a sectional view of the conduit 1090 has been illustrated. This sectional view more clearly illustrates that the conduit 1090 from the tub 1012 to the inlet port 1070, indicated as numeral 1090B slopes downwardly. The downward slope from the tub 1012 to the inlet port 1070, indicated as numeral 1090B is approximately five degrees. The downward slope of the conduit 1090 is important as it aids in letting air escape from the housing 1062. More specifically, as the housing 1062 is filled from bottom to top the gradual slope in the conduit 1090 helps to allow air to escape from the housing 1062 as the housing 1062 is being filled with liquid.

Figure 11D:
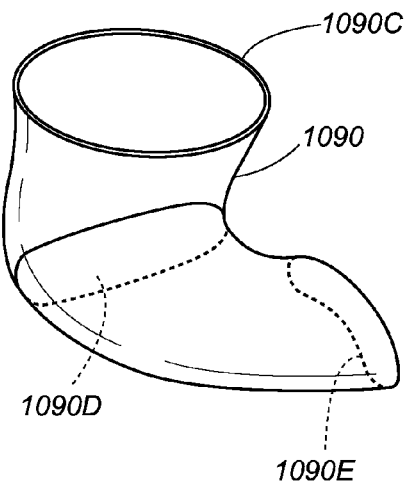
FIG. 11D is a perspective view of the conduit illustrated in FIG. 11A.

Further, as illustrated in FIG. 11D, the conduit 1090 my have a gradually-decreasing cross-sectional area. This may be seen with reference to the three cross sections illustrated as 1090C, 1090D, and 1090E. As illustrated, the cross-sectional area 1090D located at a middle portion of the conduit 1090 is smaller than the cross-sectional area 1090C at the inlet of the conduit 1090. Further, the cross-sectional area 1090E located at the end of the conduit 1090, where it feeds into the inlet port 1070, is smaller than the cross-sectional area 1090D at the middle portion of the conduit 1090. The gradual slope in the conduit 1090 and the gradually decreasing cross-sectional area cooperate to provide a slow acceleration of liquid through the conduit 1090. The slow liquid acceleration through the conduit 1090 provides time for air to escape the liquid and minimizes or eliminates air entrainment in the liquid and increases the efficiency of the wash pump 1060. It has also been contemplated that the conduit 1090 may maintain a consistent cross-sectional area through its entire length but that there may be a reduction in cross-sectional area from the outlet 1052 to the conduit 1090. Such a reduction of cross-sectional area may occur through the length of the outlet 1052 and may be approximately a 40% decrease in cross-sectional area.

Referring back to FIG. 11A, during the wash cycle, when liquid is being recirculated within the dishwasher 10 the sloped configuration of the bottom wall 1042 directs liquid into the sump 1050. The recirculation pump assembly 1034 removes such liquid and/or wash chemistry from the sump 1050 through the outlet 1052 defined in the bottom of the sump 1050. The grate 1095 acts to strain out large debris particles from the liquid before the liquid reaches the housing 1062. A divider 1090A has been illustrated as being located in the lower end of the conduit 1090 and aid in introducing the liquid into the housing 1062 in a direction that is either straight into the housing 1062 or in the same direction as the rotary filter 1130 is turning. The liquid may then be filtered by the rotary filter 1130 and re-circulated by the wash pump 1060 into the tub 1012.

Figure 12:
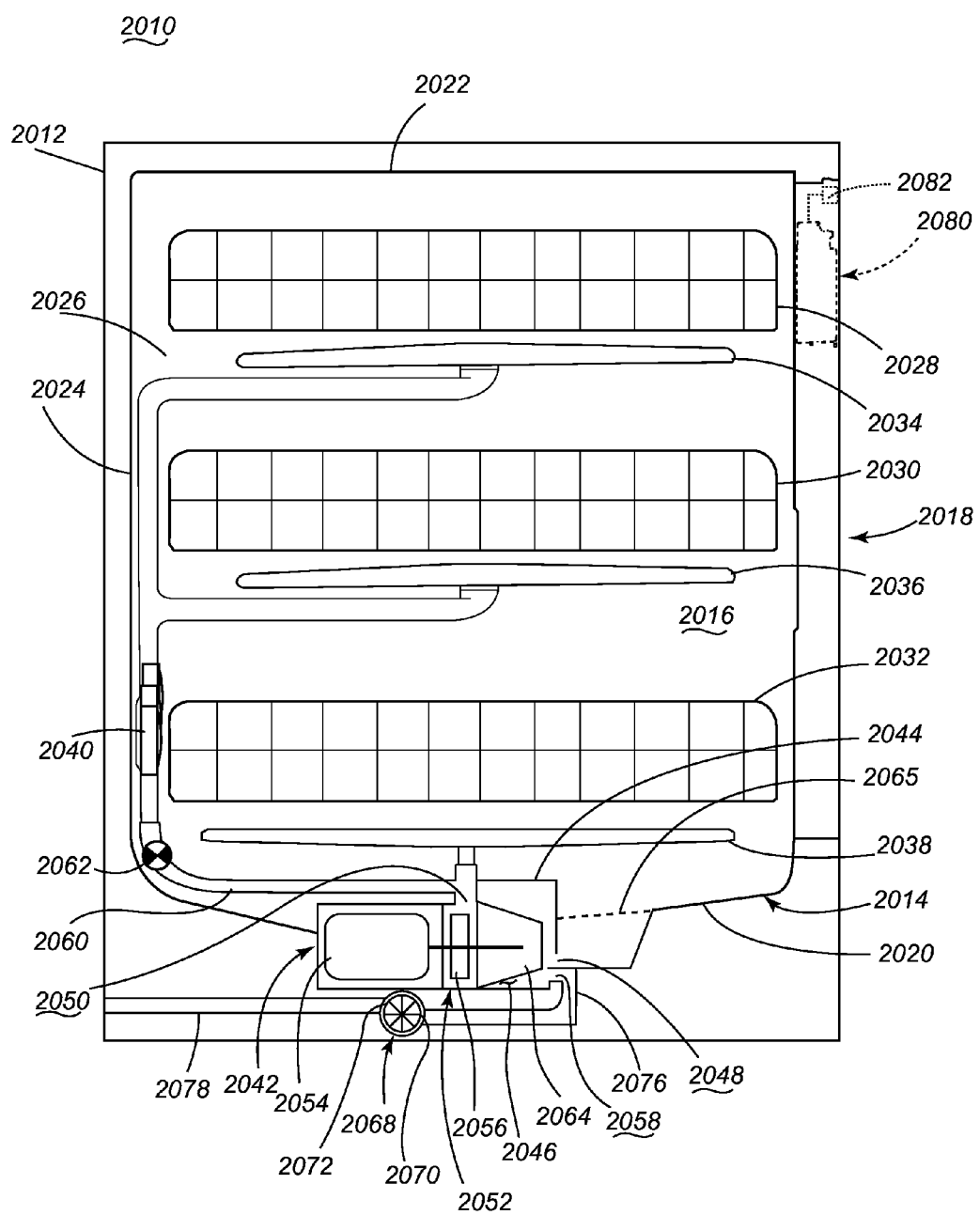
FIG. 12 is a schematic view of an example automatic dishwasher in accordance with one embodiment of the invention.

FIG. 12 is a schematic view of another example automatic dishwasher 2010 in accordance with an embodiment of the invention. The dishwasher 2010 can treat dishes according to an automatic cycle of operation. Depending on whether the dishwasher 2010 is a stand-alone or built-in, the dishwasher includes a cabinet 2012 that may be a chassis/frame with or without panels attached, respectively. The dishwasher 2010 shares many features of a conventional automatic dishwasher, which will not be described in detail herein except as necessary for a complete understanding of the invention. An open-faced tub 2014 is located within the cabinet 2012 and may at least partially define a treating chamber 2016, having an open face, for washing or otherwise treating dishes.

A closure element, such as a door assembly 2018, may be movably mounted to the dishwasher 2010 for movement between opened and closed positions to selectively open and close the treating chamber access opening defined by the open face of the tub 2014. Thus, the door assembly 2018 provides accessibility to the treating chamber 2016 for the loading and unloading of dishes or other washable items. It should be appreciated that the door assembly 2018 may be secured to the lower front edge of the cabinet 2012 or to the lower front edge of the tub 2014 via a hinge assembly (not shown) configured to pivot the door assembly 2018. When the door assembly 2018 is closed, user access to the treating chamber 2016 may be prevented, whereas user access to the treating chamber 2016 may be permitted when the door assembly 2018 is open. Alternatively, the closure element may be slidable relative to the cabinet 2012, such as in a drawer-type dishwasher, wherein the access opening for the treating chamber 2016 is formed by an open-top tub. Other configurations of the closure element relative to the cabinet 2012 and the tub 2014 are also within the scope of embodiments of the invention.

The tub 2014 includes a bottom wall 2020 and a top wall 2022, with a rear wall 2024 joining the bottom and top walls 2020, 2022, and two side walls 2026 joining the bottom and top walls 2020, 2022 and extending from the rear wall 2024 toward the open face of the tub 2014. When the door assembly 2018 is closed, the door assembly 2018 effectively forms a front wall of the tub 2014 to enclose the treating chamber 2016.

Dish holders, illustrated in the form of upper, middle, and lower dish racks 2028, 2030, 2032, may be located within the treating chamber 2016 and receive dishes for treatment, such as washing. The upper, middle, and lower racks 2028, 2030, 2032 are typically mounted for slidable movement in and out of the treating chamber 2016 for ease of loading and unloading. Other dish holders may be provided, such as a silverware basket, separate from or combined with the upper, middle, and lower racks 2028, 2030, 2032. As used in this description, the term "dish(es)" is intended to be generic to any item, single or plural, that may be treated in the dishwasher 2010, including, without limitation, dishes, plates, pots, bowls, pans, glassware, silverware, or any other washable item.

A spray system may be provided for spraying liquid in the treating chamber 2016 and may be provided in the form of, for example, an upper spray assembly 2034, a middle spray assembly 2036, and a lower spray assembly 2038. The upper spray assembly 2034, the middle spray assembly 2036, and the lower spray assembly 2038 are located, respectively, beneath the upper rack assembly 2028, beneath the middle rack assembly 2030, and beneath the lower rack assembly 2032 and are illustrated as rotating spray arms by example but are not limited to such positions and sprayer type. The spray system may further include an additional spray assembly 2040. For example, a distribution header or spray manifold may be located at the rear of the tub 2014 at any vertical position. An exemplary spray manifold is set forth in detail in U.S. Pat. No. 7,594,513, issued Sep. 29, 2009, and titled "Multiple Wash Zone Dishwasher," which is incorporated herein by reference in its entirety. The illustrated additional spray assembly 2040 is illustrated as being located adjacent the lower dish rack 2032 along the rear wall 2024 of the treating chamber 2016.

A recirculation system may be provided for recirculating liquid from the treating chamber 2016 to the spray system. The recirculation system may include a filter and pump assembly 2042 having a housing 2044 that defines a sump 2046. The sump 2046 collects the liquid sprayed in the treating chamber 2016. The sump 2046 can be considered a remote sump as it is located within the housing 2044, not exposed directly to the tub 2014, and not readily accessible to a user. An inlet 2048 of the housing 2044 is fluidly coupled to the tub liquid outlet, which may be formed by a sloped of recessed portion of the bottom wall 2020 of the tub 2014, as illustrated, or some other tubing or structure. A recirculation outlet 2050 is illustrated as being fluidly coupled to the spray assemblies 2034, 2036, 2038, 2040 to define a liquid recirculation path from the sump 2046 to the spray assemblies 2034, 2036, 2038, 2040 and treating chamber 2016.

A wash or recirculation pump 2052 fluidly couples to the recirculation path to pump the liquid from the sump 2046 to the spray assemblies 2034, 2036, 2038, 2040 and in the manner fluidly couples the treating chamber 2016 to the liquid spraying system. A motor 2054 can be drivingly coupled to the recirculation pump 2052. The recirculation pump 2052 includes an impeller 2056 in fluid communication with the sump 2046.

During a wash or recirculation cycle, the impeller 2056, driven by the motor 2054, may draw liquid from the sump 2046 and the liquid may be simultaneously or selectively pumped through a supply conduit 2060 to each of the spray assemblies 2034, 2036, 2038, 2040 for selective spraying. A diverter 2062 may be provided within a portion of the supply conduit 2060 for selectively controlling the supply of liquid to one or more of the spray assemblies 2034, 2036, 2038, 2040 at a time. As such, downstream of the diverter 2062, the supply conduit 2060 may branch into multiple conduits, each supplying at least one of the spray assemblies 2034, 2036, 2038, 2040. While not shown, a liquid supply system may include a water supply conduit coupled with a household water supply for supplying water to the treating chamber 2016.

A filter assembly 2064 may be provided between the inlet 2048 and the impeller 2056 for allowing soils of only a predetermined size into the impeller 2056. In some embodiments, the filter assembly 2064 may include a rotatable filter provided within the sump 2046 and driven by the motor 2054 for rotation with the impeller 2056. In other embodiments, the filter assembly 2064 may be non-rotatable. Other apparatus for filtering the wash liquid may also be provided in addition to or instead of the filter assembly 2064. In one non-limiting example, a coarse screen filter 2065 may be provided at the bottom wall 2020 of the tub 2014 to prevent large objects or soils from entering the sump 2046.

The rotational axes of the motor 2054, impeller 2056, and filter assembly 2064 are illustrated herein as being horizontally-oriented, with respect to the normal operational position of the dishwasher 2010. In other embodiments of the invention, the rotational axes of the motor 2054, impeller 2056, and/or filter assembly 2064 may be vertically-oriented, or at an oblique angle between horizontal and vertical.

A drain outlet 2058 is also included in the housing 2044. The drain outlet 2058 is adjacent the inlet 2048. A drain pump 2068 has an inlet 7200, which can be fluidly coupled to the drain outlet 2058, and an outlet 2072 configured to fluidly couple to a household drain. The drain pump 2068 may be driven by a separate motor 2074 (FIG. 15) or by the motor 2054 for the recirculation pump 2052. In the illustrated example, an outlet conduit 2076 fluidly couples the drain outlet 2058 to the inlet 2070 of the drain pump 2068. The drain pump 2068 can draw liquid from the sump 2046, through the drain outlet 2058 and the outlet conduit 2076, and pump the liquid out of the dishwasher 2010 to a household drain line (not shown) via, for example, a drain conduit 2078.

A control system including a controller 2080 may also be included in the dishwasher 2010, which may be operably coupled with various components of the dishwasher 2010 to implement a cycle of operation. The controller 2080 may be located within the door assembly 2018 as illustrated, or it may alternatively be located somewhere within the cabinet 2012. The controller 2080 may also be operably coupled with a control panel or user interface 2082 for receiving user-selected inputs and communicating information to the user. The user interface 2082 may include operational controls such as dials, lights, switches, and displays enabling a user to input commands, such as a cycle of operation, to the controller 2080 and receive information.

Figure 13:
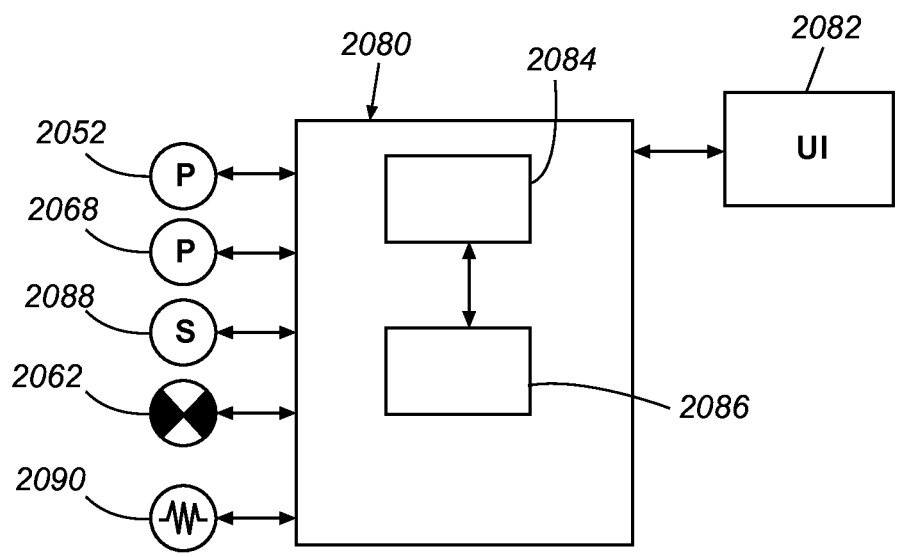
FIG. 13 is a schematic of an example control system for the example dishwasher of FIG. 12.

As illustrated schematically in FIG. 13, the controller 2080 may be coupled with the recirculation pump 2052 for recirculating the wash liquid during the cycle of operation, the drain pump 2068 for draining liquid from the treating chamber 2016, and the diverter 2062 for directing liquid to the spray assemblies 2036, 2038, and 2040. The controller 2080 may be provided with a memory 2084 and a central processing unit (CPU) or processor 2086. The memory 2084 may be used for storing control software that may be executed by the processor 2086 in completing a cycle of operation using the dishwasher 2010 and any additional software. For example, the memory 2084 may store one or more pre-programmed cycles of operation that may be selected by a user and completed by the dishwasher 2010. The controller 2080 may also receive input from one or more sensors 2088. Non-limiting examples of sensors that may be communicably coupled with the controller 2080 include a temperature sensor and turbidity sensor to determine the soil load associated with a selected grouping of dishes, such as the dishes associated with a particular area of the treating chamber 2016.

The memory 2084 may include volatile memory such as synchronous dynamic random access memory (SDRAM), a dynamic random access memory (DRAM), RAMBUS® dynamic random access memory (RDRAM) and/or any other type of random access memory (RAM) device(s); and/or non-volatile memory such as flash memory(-ies), or flash memory device(s). The processor 2086 can be implemented by, for example, one or more Atmel®, Intel®, AMD®, and/or ARM® microprocessors. Of course, other processors from other processor families and/or manufacturers are also appropriate.

The dishwasher 2010 may include all of the above exemplary systems, a selection of the above exemplary systems, and/or other systems not listed above as desired. Further, some of the systems may be combined with other systems and/or may share components with other systems. Examples of other systems that the dishwasher may further include are a dispensing system that supplies one or more treating agents or chemistries to the treating chamber 2016, heating system for heating the liquid contained in the sump 2046, and/or an air supply system that may provide air, which may be heated or not heated, to the treating chamber 2016, such as for drying and/or cooling the dishes.

Figure 14:
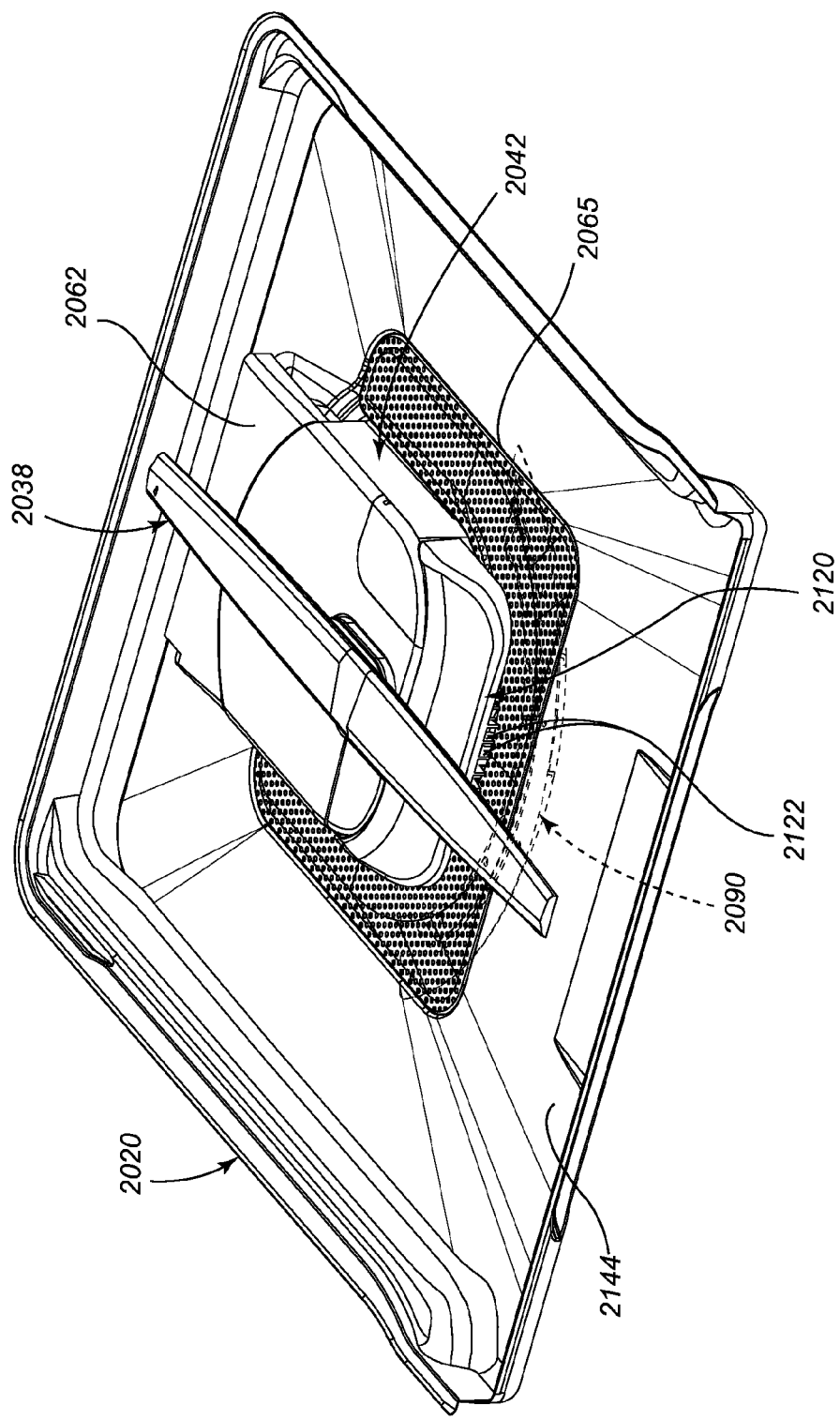
FIG. 14 is a perspective view of a detailed embodiment of the bottom wall and a portion of the recirculation system for a dishwasher.

FIG. 14 shows an exemplary bottom wall 2020 and a portion of the recirculation system for the dishwasher 2010. As shown, the lower spray assembly 2038 can be mounted to a top portion of the filter and pump assembly 2042 and the diverter 2062 can be located at a rear portion of the filter and pump assembly 2042. A heater 2090 (shown in phantom) can also be included for heating wash liquid in the sump 2046 or being recirculated. In some embodiments of the invention, the heater 2090 may further heat air for drying dishes as well as the wash liquid in the sump 2046. In this case, a fan or blower (not shown) may be provided as a component of the filter and pump assembly 2042.

The coarse screen filter 2065 extends over the inlet 2048 of the housing 2044 to separate the inlet 2048 from the treating chamber 2016 (FIG. 12). The coarse screen filter 2065 further keeps large soils and debris away from the heater assembly 2090. In addition to the coarse screen filter 2065, a strainer 2120 with depending ribs 2122 is provided to prevent larger and/or longer objects or soils from entering the sump 2046. The strainer 2120 also reduces turbulence in the wash liquid around the sump 2046, enabling the recirculation pump 2052 to run with less wash liquid.

While a portion of the filter and pump assembly 2042 is illustrated as being located above the bottom wall 2020 of the tub 2014 it will be understood that this need not be the case. The entire filter and pump assembly may be remote from the tub 2014 and the treating chamber 2016. For example, the filter and pump assembly may be located in a lower back portion of the dishwasher 2010 underneath the tub 2014.

Figure 15:
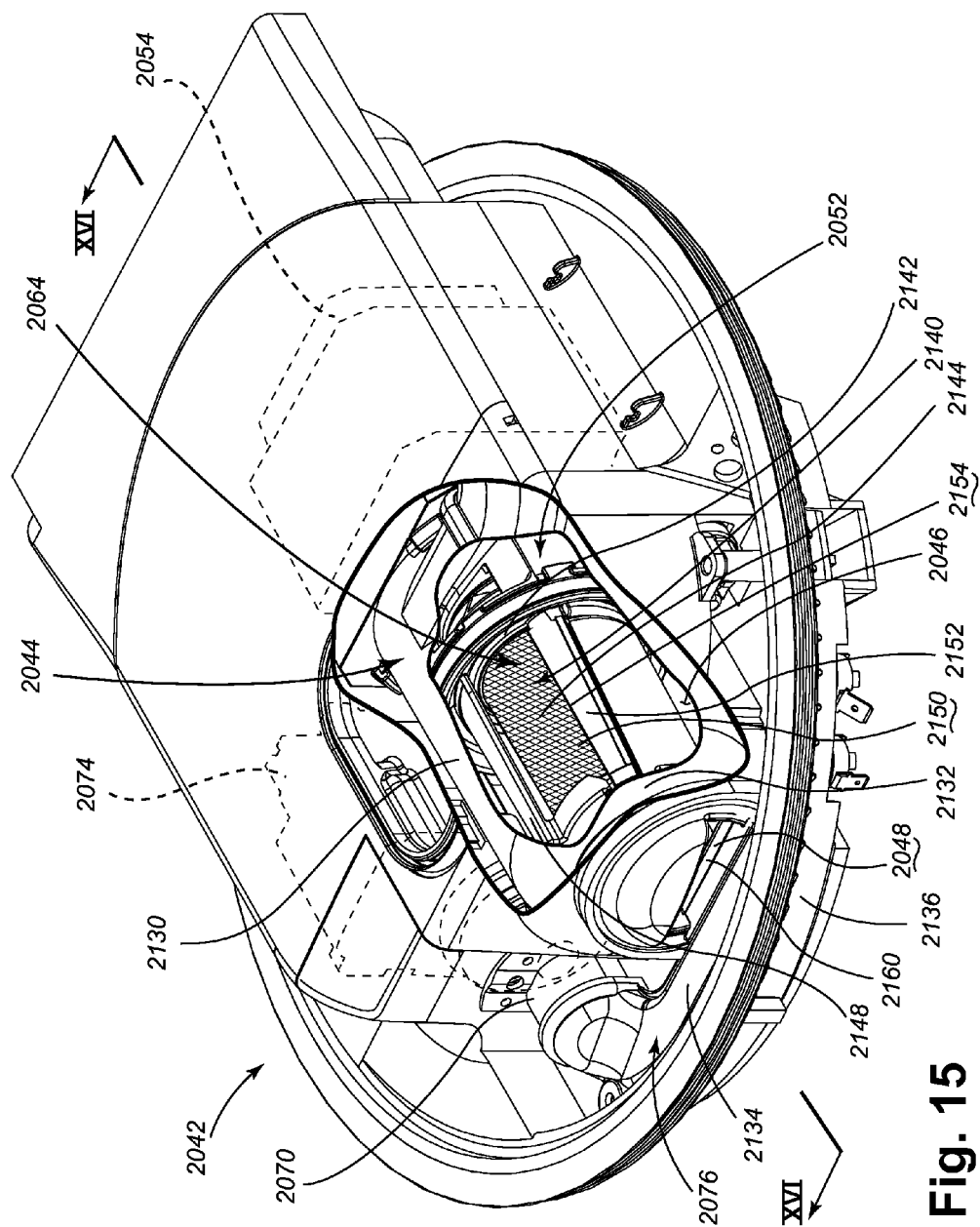
FIG. 15 is a perspective view of a pump assembly that may be utilized in the recirculation system of FIG. 14.
Figure 16:
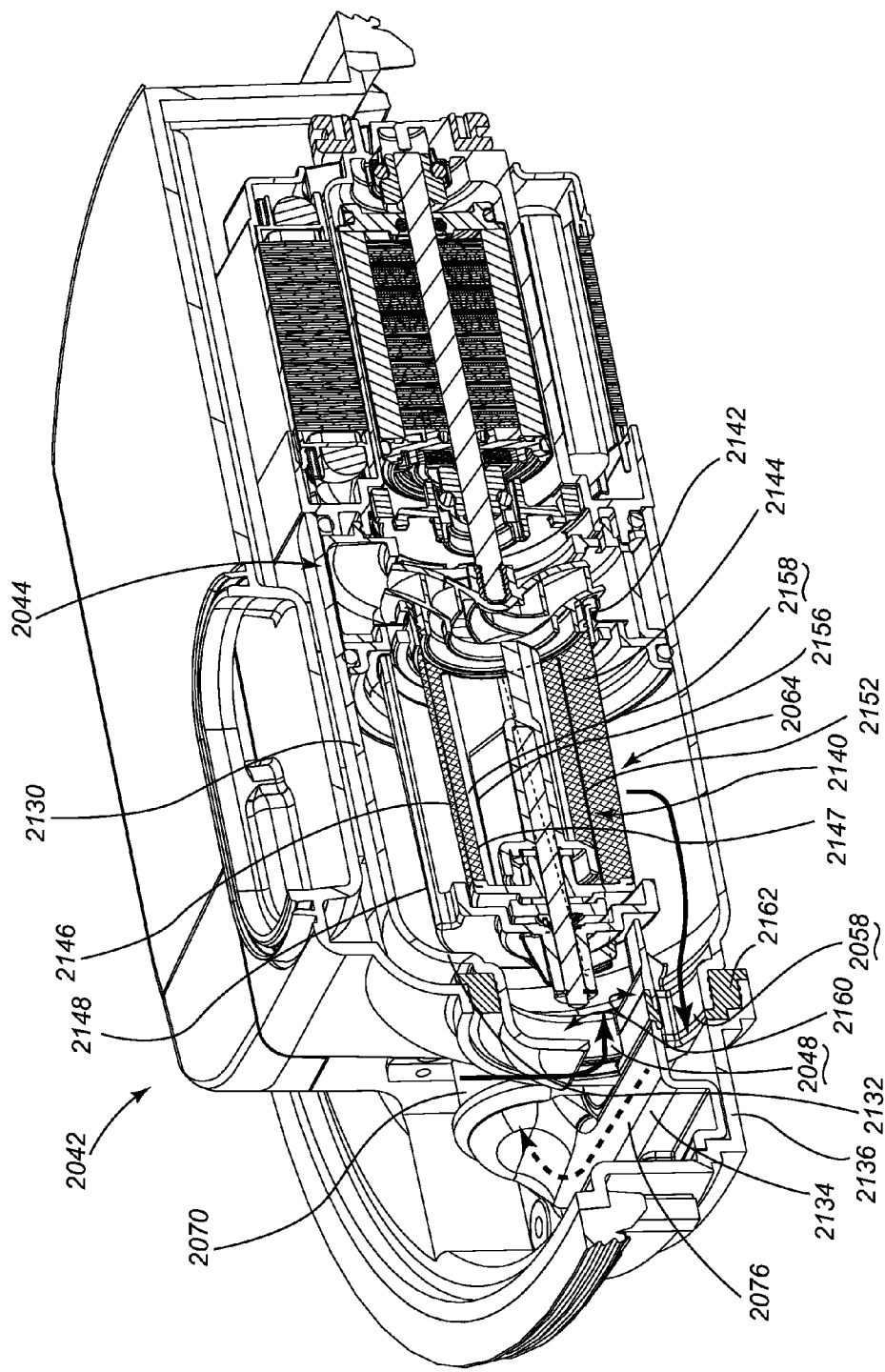
FIG. 16 is a cross-sectional view through line XVI-XVI of FIG. 15.

FIGS. 15-17 show a detailed embodiment of a portion of the dishwasher 2010 in accordance with an embodiment of the present invention. The detailed embodiment shares many common elements with the schematic embodiment of FIG. 12, and like elements are numbered with corresponding reference numerals. More specifically, FIG. 15 shows the filter and pump assembly 2042 in more detail. As can more clearly be seen, the housing 2044 is elongated and horizontally-orientated. By "horizontally-oriented," the axes may be parallel or substantially parallel to a surface on which the dishwasher 2010 rests, i.e. a normal operational position of the dishwasher. Further, the housing 2044 includes an outer peripheral wall 2130 in which the inlet 2048 and drain outlet 2058 are located. More specifically, the housing 2044 and the outer peripheral wall 2130 include a front side 2132 and the inlet 2048 and the adjacent drain outlet 2058 are located therein.

In the illustrated embodiment, the filter assembly 2064 includes a rotatable filter 2140 that may include a hollow body formed by a frame 2142 and a screen 2144 and may have an exterior and an interior. The hollow body of the rotatable filter 2140 may be any suitable shape including that of a cone or a cylinder. The screen 2144 is supported by the frame 2142 and the position of the screen 2144 may be fixed relative to the frame 2142.

FIG. 16 is a cross-sectional view through line XVI-XVI of FIG. 15 and more clearly illustrates that the outlet conduit 2076 includes an upper piece 2134 that overlies a base 2136 of the filter and pump assembly 2042. Alternatively, the outlet conduit 2076 could be formed from a single piece.

Further, the filter 2140 is illustrated as being coupled to the impeller 2056 such that the rotation of the impeller 2056 rotates the filter 2140. The screen 2144 may have a first surface 2146 defining an upstream surface and a second surface 2147 defining a downstream surface. The rotatable filter 2140 may be located within the circulation circuit such that the circulated liquid passes through the rotatable filter 2140 from the upstream surface defined by the first surface 2146 to a downstream surface defined by the second surface 2147. In this manner, recirculating liquid passes through the rotatable filter 2140 from the upstream surface to the downstream surface to effect a filtering of the liquid. In the described flow direction, the upstream surface correlates to the outer of first surface 2144 of the rotatable filter 2140 and the downstream surface correlates to the inner or second surface 2147 of the rotatable filter 2140 such that the rotatable filter 2140 separates the upstream portion of the sump 2046 from the recirculation outlet 2050.

A shroud 2148 may at least partially enclose the rotating filter 2140. The shroud 2148 may be fluidly accessible through multiple access openings 2150. It is contemplated that the shroud 2148 may include any number of access openings 2150 (FIG. 15) including a singular access opening 2150. An impedance bar or flow diverter 2152 may extend along and be spaced away from at least a portion of the rotatable filter 2140 to define a gap 2154 (FIG. 15) between the diverter 2152 and the rotatable filter 2140. In the illustrated example, the diverter 2152 is spaced from the first surface 2144. Further, a second flow diverter 2156 extends along and is spaced away from the second surface 2147 to define a gap 2158 there between. An exemplary rotatable filter having multiple flow diverters and its operation is set forth in detail in U.S. Patent Application Publication No. 2013/0319485, published Dec. 5, 2013, and titled "Rotating Filter for a Dishwasher," which is incorporated herein by reference in its entirety. Further, the shroud 2148 and diverters 2152 and 2156 form artificial boundaries spaced from the rotating filter 2140 such that liquid passing between them applies a greater shear force on rotating filter 2140 than liquid in an absence of the shroud 2148 and diverters 2152 and 2156. The shear forces aid in removing foreign soil from the rotating filter 2140 as described in detail in the U.S. patent application Ser. No. 13/163,945, filed on Jun. 20, 2011, now U.S. Pat. No. 8,627,832, issued Jan. 14, 2014, entitled "Rotating Filter for a Dishwasher," which is incorporated by reference herein in its entirety.

FIG. 17 is an enlarged view of the front portion of the filter and pump assembly 2042. As may more easily be seen, the housing 2044 includes a mounting 2160 located on the front side 2132. The mounting 2160 incorporates the inlet 2048 of the housing 2044 and the drain outlet 2058. The mounting 2160 may be integrally formed with the front side 2132 of the peripheral wall 2130 or may be mounted in any suitable manner thereto. A grommet or gasket 2162 can surround the mounting 2160. The outlet conduit 2076 can be coupled directly to the gasket 2162, an intermediate piece 2164, or the mounting 2160 itself.

With general reference to FIGS. 15-17, in operation, wash liquid, such as water and/or treating chemistry (i.e., water and/or detergents, enzymes, surfactants, and other cleaning or conditioning chemistry), enters the tub 2014, flows through the coarse screen filter 2065, and enters the housing 2044 via the inlet 2048 where it flows into the sump 2046. During recirculation the recirculation pump 2052 is active and a mixture of liquid and foreign objects such as soil particles may advance through the inlet 2048 to fill the sump 2046.

The activation of the recirculation pump 2052 causes the impeller 2056 and the rotating filter 2140 to rotate. The rotation of the filter 2140 causes the liquid and soils within the housing 2044 to rotate in the same direction as the filter 2140. The recirculation flow path may circumscribe at least a portion of the shroud 2148 and enters through access opening(s) 2150 therein. The rotation of the impeller 2056 draws liquid from the sump 2046 and forces the liquid by rotation of the impeller 2056 outward such that it is advanced through the recirculation outlet 2050. The filter assembly 2064 allows soils of only a predetermined size past the screen 2144 into its hollow interior where it may reach the impeller 2056. Soils larger than the predetermined size will not pass through the screen 2144 and will remain in the sump 2046.

When wash liquid leaves the recirculation outlet 2050 it may be directed to the diverter 2062. The diverter 2062 supplies the wash liquid to one or more of the sprayers 2034, 2036, 2038, 2040 (FIG. 12). It is contemplated that all liquid from the recirculation pump 2052 may pass through the diverter 2062, even liquid supplied to the lower spray assembly 2038. Alternatively, the diverter 2062 may only control liquid to the spray assemblies 2034, 2036, and 2040.

When liquid is delivered to the assemblies 2034, 2036, 2038, 2040, it is expelled from the assemblies 2034, 2036, 2038, 2040 onto any dishes positioned in the treating chamber 2016. Liquid removes soil particles located on the dishes, and the mixture of liquid and soil particles falls onto the bottom wall of the tub 2014. The sloped configuration of the bottom wall of the tub 2014 directs that mixture into the sump 2046. The recirculation pump 2052 is fluidly coupled downstream of the downstream surface of the rotating filter 2140 and if the recirculation pump 2052 is shut off then any liquid and soils within the sump 2046 formed by the housing 2044 will settle in the sump 2046 where the liquid and any soils may be subsequently drained by the drain pump 2068.

During draining, the drain pump 2068 is active, and wash liquid and soils that are in the sump 2046 may exit the housing 2044 via the drain outlet 2058 and may flow through the outlet conduit 2076 to the inlet 2070 of the drain pump 2068. The drain pump 2068 may expel such liquid and soils out its outlet 2072 to a household drain.

There are multiple advantages of the present disclosure arising from the various features of the method, apparatuses, and system described herein. For example, the embodiments of the apparatus described above allow for both the recirculation pump and the drain pump to be fluidly coupled to the sump. The embodiments described above provide for a variety of benefits including enhanced filtration such that soil is filtered from the liquid and not re-deposited on dishes and allow for cleaning of the rotating filter throughout the life of the dishwasher and this maximizes the performance of the dishwasher. Thus, such embodiments require less user maintenance than required by typical dishwashers.

To the extent not already described, the different features and structures of the various embodiments can be used in combination with each other as desired. That one feature is not illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An automatic dishwasher for treating dishes according to a cycle of operation, comprising:
    a tub at least partially defining a treating chamber having a tub liquid outlet;
    a liquid spraying system having a sprayer supplying liquid to the treating chamber; and
    a filter and pump assembly, comprising:
        a housing having a peripheral wall, defining a sump within the housing, and having a housing inlet fluidly coupled to the tub liquid outlet, a recirculation outlet fluidly coupled to the sprayer to define a liquid recirculation path from the sump to the sprayer, and a drain outlet and where the housing defines a remote sump fluidly coupled to the tub via the housing inlet;
        a rotatable filter located within the housing and having an upstream surface and a downstream surface and fluidly separating the housing inlet from the recirculation outlet to filter liquid recirculated through the sump;
        a wash pump coupled to the housing and configured to pump the liquid from the sump through the recirculation outlet to the sprayer and where the wash pump includes an impeller and the filter is coupled to the impeller such that the rotation of the impeller rotates the filter; and
        a drain pump having a drain pump inlet fluidly coupled to the drain outlet of the housing and a drain pump outlet configured to fluidly couple to a household drain.

2. The automatic dishwasher of claim 1 wherein the housing inlet and drain outlet are adjacent.

3. The automatic dishwasher of claim 2 wherein the adjacent housing inlet and drain outlet are on a front side of the housing.

4. The automatic dishwasher of claim 3 wherein the housing further comprises a mounting located on the front side and the mounting incorporates the housing inlet and the drain outlet.

5. The automatic dishwasher of claim 4, further comprising a grommet surrounding the mounting.

6. The automatic dishwasher of claim 2 wherein the housing comprises an outer peripheral wall in which the adjacent housing inlet and drain outlet are located.

7. The automatic dishwasher of claim 6 wherein the housing is elongated.

8. The automatic dishwasher of claim 7 wherein the housing is horizontally-orientated.

9. The automatic dishwasher of claim 1, further comprising a diverter extending along and spaced away from at least a portion of the rotatable filter to define a gap between the diverter and the rotatable filter.

10. An automatic dishwasher for treating dishes according to a cycle of operation, comprising:
    a tub at least partially defining a treating chamber having a tub liquid outlet;
    a liquid spraying system having a sprayer supplying liquid to the treating chamber; and
    a remote housing and pump assembly comprising:
        a housing, defining a sump that is not exposed directly to the tub, and having a housing inlet fluidly coupled to the tub liquid outlet, a recirculation outlet fluidly coupled to the sprayer to define a liquid recirculation path from the sump to the sprayer, and a drain outlet where the housing inlet and drain outlet are adjacent and the housing includes a mounting and the mounting incorporates the housing inlet and the drain outlet;
        a wash pump coupled to the housing to pump the liquid from the sump through the recirculation outlet to the sprayer; and
        a drain pump having an inlet fluidly coupled to the drain outlet of the housing and an outlet configured to fluidly couple to a household drain.

11. The automatic dishwasher of claim 10 wherein the mounting is located on a front side.

12. The automatic dishwasher of claim 11, further comprising a grommet surrounding the mounting.

13. The automatic dishwasher of claim 10 wherein the housing comprises an outer peripheral wall in which the adjacent housing inlet and drain outlet are located.

14. The automatic dishwasher of claim 13 wherein the housing is elongated and horizontally-orientated.

15. The automatic dishwasher of claim 10, further comprising a filter having an upstream surface and a downstream surface and fluidly separating the housing inlet from the recirculation outlet to filter liquid recirculated through the sump.

16. The automatic dishwasher of claim 15 wherein the filter is a rotatable filter and the wash pump comprises an impeller and the filter is coupled to the impeller such that the rotation of the impeller rotates the filter.

17. An automatic dishwasher for treating dishes according to a cycle of operation, comprising:
    a tub at least partially defining a treating chamber having a tub liquid outlet;
    a liquid spraying system having a sprayer supplying liquid to the treating chamber; and
    a filter and pump assembly, comprising:
        a housing having a peripheral wall, defining a sump within the housing, and having a housing inlet fluidly coupled to the tub liquid outlet, a recirculation outlet fluidly coupled to the sprayer to define a liquid recirculation path from the sump to the sprayer, and a drain outlet and where the housing defines a remote sump fluidly coupled to the tub via the housing inlet and where the housing inlet and drain outlet are adjacent and the housing includes a mounting located on a front side and the mounting incorporates the housing inlet and the drain outlet;
        a filter located within the housing and having an upstream surface and a downstream surface and fluidly separating the housing inlet from the recirculation outlet to filter liquid recirculated through the sump;

a wash pump coupled to the housing and configured to pump the liquid from the sump through the recirculation outlet to the sprayer; and a drain pump having a drain pump inlet fluidly coupled to the drain outlet of the housing and a drain pump outlet configured to fluidly couple to a household drain.

* * * * *